US012783058B2

(12) United States Patent
Meyer et al.

(10) Patent No.: US 12,783,058 B2
(45) Date of Patent: Nov. 3, 2026

(54) GESTURE DISAMBIGUATION

(71) Applicant: Apple Inc., Cupertino, CA (US)

(72) Inventors: Adam S. Meyer, Cupertino, CA (US); Peter C. Tsoi, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 68 days.

(21) Appl. No.: 18/799,729

(22) Filed: Aug. 9, 2024

(65) Prior Publication Data

US 2025/0110566 A1 Apr. 3, 2025

Related U.S. Application Data

(60) Provisional application No. 63/541,841, filed on Sep. 30, 2023, provisional application No. 63/587,103, filed on Sep. 30, 2023.

(51) Int. Cl.
*G06F 3/01* (2006.01)

(52) U.S. Cl.
CPC .................................... *G06F 3/017* (2013.01)

(58) Field of Classification Search
None
See application file for complete search history.

(56) References Cited

U.S. PATENT DOCUMENTS

| | | | |
|---|---|---|---|
| 8,452,600 B2 | 5/2013 | Fleizach | |
| 9,294,819 B2 | 3/2016 | Lee et al. | |
| 9,804,733 B2 | 10/2017 | Walline et al. | |
| 10,489,459 B1 | 11/2019 | Jastrzebski et al. | |
| 10,997,963 B1 | 5/2021 | Baligar et al. | |
| 11,410,541 B1 * | 8/2022 | Chung | G01S 5/0284 |
| 11,934,569 B2 | 3/2024 | Pastrana Vicente et al. | |
| 2009/0123046 A1 | 5/2009 | Mielekamp et al. | |
| 2011/0197147 A1 | 8/2011 | Fai | |
| 2011/0320963 A1 * | 12/2011 | Wong | H04N 21/631 715/755 |
| 2012/0272179 A1 * | 10/2012 | Stafford | G06F 3/0482 345/157 |
| 2012/0293519 A1 | 11/2012 | Ribble et al. | |
| 2013/0019178 A1 | 1/2013 | Morikawa et al. | |
| 2013/0159939 A1 | 6/2013 | Krishnamurthi | |
| 2013/0162530 A1 | 6/2013 | Takahashi | |
| 2014/0079247 A1 | 3/2014 | Sanders | |
| 2014/0136518 A1 | 5/2014 | Shum et al. | |
| 2014/0359651 A1 | 12/2014 | Lee et al. | |
| 2015/0131855 A1 | 5/2015 | Hanzawa et al. | |
| 2015/0254905 A1 | 9/2015 | Ramsby et al. | |

(Continued)

FOREIGN PATENT DOCUMENTS

| | | | |
|---|---|---|---|
| AU | 2021239971 A1 | 9/2022 | |
| CN | 117873325 A | 4/2024 | |

(Continued)

OTHER PUBLICATIONS

International Patent Application No. PCT/US2024/029855; Int'l Search Report and the Written Opinion; dated Sep. 18, 2024; 13 pages.

(Continued)

*Primary Examiner* — Parul H Gupta
(74) *Attorney, Agent, or Firm* — BAKERHOSTETLER LLP; Kyle B. Morse; Mark I. Bentley

(57) ABSTRACT

The present disclosure generally relates to disambiguating between gestures.

45 Claims, 8 Drawing Sheets

(56) References Cited

U.S. PATENT DOCUMENTS

| | | | | |
|---|---|---|---|---|
| 2016/0125705 | A1* | 5/2016 | Hurtig | G06F 3/04883 340/4.11 |
| 2016/0170710 | A1* | 6/2016 | Kim | G06F 3/013 704/275 |
| 2017/0150139 | A1 | 5/2017 | Lee et al. | |
| 2018/0046352 | A1 | 2/2018 | Johnson et al. | |
| 2018/0081447 | A1 | 3/2018 | Gummadi et al. | |
| 2018/0284872 | A1 | 10/2018 | Schluessler et al. | |
| 2018/0330515 | A1 | 11/2018 | Stall et al. | |
| 2019/0197785 | A1 | 6/2019 | Tate-Gans et al. | |
| 2019/0247130 | A1 | 8/2019 | State et al. | |
| 2019/0342425 | A1 | 11/2019 | Cheng et al. | |
| 2020/0082493 | A1 | 3/2020 | Wang et al. | |
| 2020/0320794 | A1 | 10/2020 | Huang et al. | |
| 2021/0041956 | A1 | 2/2021 | Hasburgh | |
| 2021/0089132 | A1 | 3/2021 | Mathur | |
| 2022/0137713 | A1 | 5/2022 | Hu et al. | |
| 2022/0214857 | A1 | 7/2022 | Lambourne et al. | |
| 2022/0229534 | A1 | 7/2022 | Terre et al. | |
| 2022/0253139 | A1 | 8/2022 | Berliner et al. | |
| 2022/0382377 | A1* | 12/2022 | Hosseinkhani Loorak | G06F 3/04847 |
| 2023/0074380 | A1 | 3/2023 | Kim et al. | |
| 2023/0094522 | A1 | 3/2023 | Stauber et al. | |
| 2023/0100689 | A1 | 3/2023 | Chiu et al. | |
| 2023/0146384 | A1 | 5/2023 | Terre et al. | |
| 2023/0152935 | A1 | 5/2023 | McKenzie et al. | |
| 2023/0165639 | A1 | 6/2023 | Dulin et al. | |
| 2023/0315247 | A1 | 10/2023 | Pastrana Vicente et al. | |
| 2025/0271856 | A1 | 8/2025 | Von Volkmann et al. | |
| 2025/0301556 | A1 | 9/2025 | Mouilleseaux et al. | |

FOREIGN PATENT DOCUMENTS

| | | | |
|---|---|---|---|
| EP | 3265883 | B1 | 2/2023 |
| WO | WO 2022/055822 | A1 | 3/2022 |
| WO | WO 2023/014618 | A1 | 2/2023 |

OTHER PUBLICATIONS

International Patent Application No. PCT/US2024/030462; Int'l Search Report and the Written Opinion; dated Sep. 30, 2024; 21 pages.

International Patent Application No. PCT/US2024/032394; Invitation to Pay Add'l Fees; dated Sep. 25, 2024; 20 pages.

International Patent Application No. PCT/US2024/032401; Int'l Search Report and the Written Opinion; dated Oct. 14, 2024; 16 pages.

International Patent Application No. PCT/US2024/030181; Int'l Search Report and the Written Opinion; dated Oct. 31, 2024; 21 pages.

International Patent Application No. PCT/US2024/032394; Int'l Search Report and the Written Opinion; dated Nov. 15, 2024; 23 pages.

International Patent Application No. PCT/US2024/047378; Invitation to Pay Add'l Fees; dated Dec. 20, 2024; 13 pages.

International Patent Application No. PCT/US2024/047378; Int'l Search Report and the Written Opinion; dated Feb. 10, 2025; 22 pages.

European Patent Application No. 25150841.2; Extended Search Report; dated Feb. 18, 2025; 10 pages.

European Patent Application No. 25180843.2; Extended Search Report; dated Jul. 14, 2025; 11 pages.

U.S. Appl. No. 18/799,489; Non-Final Office Action; dated Dec. 11, 2025; 16 pages.

International Patent Application No. PCT/US2024/032401; Invitation to Pay Add'l Fees; Aug. 23, 2024; 17 pages.

"2GIG Edge™ Security & Smart Home System—User Guide"; https://2gig.com/wp-content/uploads/10029908-Rev-A-2GIG-Edge-User-Guide-0322_WEB.pdf; Nortek Security & Control LLC; © 2021; 60 pages.

"Get Back to Work Safely"; https://www.anviz.com/get-back-to-work-safely.html; Anviz Global Inc.; © 2023; accessed Sep. 10, 2024; 5 pages.

"Top 7 Use Cases for Facial Recognition in 2023"; https://www.cyberlink.com/faceme/insights/articles/228/how-to-use-facial-recognition; FaceMe; Mar. 2023; accessed Sep. 10, 2024; 12 pages.

International Patent Application No. PCT/US2024/030462; Invitation to Pay Add'l Fees; dated Aug. 9, 2024; 14 pages.

International Patent Application No. PCT/US2024/029952; Int'l Search Report and the Written Opinion; dated Sep. 12, 2024; 12 pages.

International Patent Application No. PCT/US2024/030181; Invitation to Pay Additional Fees; dated Sep. 10, 2024; 14 pages.

European Patent Application No. 25180819.2; Extended Search Report; dated Aug. 14, 2025; 10 pages.

U.S. Appl. No. 18/619,568; Non-Final Office Action; dated Nov. 28, 2025; 19 pages.

Huynh et al.; "Layerable Apps: Comparing Concurrent and Exclusive Display of Augmented Reality Applications"; IEEE Int'l Symposium on Mixed and Augmented Reality; 2022; p. 857-863.

* cited by examiner

GESTURE DISAMBIGUATION

CROSS-REFERENCE TO RELATED APPLICATIONS

This application claims priority to U.S. Provisional Patent Application Ser. No. 63/587,103, entitled "GESTURE DISAMBIGUATION" filed Sep. 30, 2023, and to U.S. Provisional Patent Application Ser. No. 63/541,841, entitled "TECHNIQUES FOR CONTROLLING DEVICES" filed Sep. 30, 2023, which are hereby incorporated by reference in their entireties for all purposes.

FIELD

The present disclosure relates generally to computer user interfaces, and more specifically to techniques for disambiguating between gestures.

BACKGROUND

Electronic devices are sometimes controlled using a gesture. For example, a user can perform a gesture to control an electronic device.

SUMMARY

Some techniques for disambiguating between gestures using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for disambiguating between gestures. Such methods and interfaces optionally complement or replace other methods for disambiguating between gestures. Such methods and interfaces reduce the cognitive burden on a user and produce a more efficient human-machine interface. For battery-operated computing devices, such methods and interfaces conserve power and increase the time between battery charges.

In some embodiments, a method that is performed at a first computer system that is in communication with one or more input devices is described. In some embodiments, the method comprises: detecting, via the one or more input devices, a first input; after detecting the first input, detecting, via the one or more input devices, a first air gesture; and in response to detecting the first air gesture: in accordance with a determination that the first input corresponds to a second computer system different from the first computer system, performing a first operation corresponding to the second computer system; and in accordance with a determination that the first input does not correspond to the second computer system, forgoing performing the first operation corresponding to the second computer system.

In some embodiments, a non-transitory computer-readable storage medium storing one or more programs configured to be executed by one or more processors of a first computer system that is in communication with one or more input devices is described. In some embodiments, the one or more programs includes instructions for: detecting, via the one or more input devices, a first input; after detecting the first input, detecting, via the one or more input devices, a first air gesture; and in response to detecting the first air gesture: in accordance with a determination that the first input corresponds to a second computer system different from the first computer system, performing a first operation corresponding to the second computer system; and in accordance with a determination that the first input does not correspond to the second computer system, forgoing performing the first operation corresponding to the second computer system.

In some embodiments, a transitory computer-readable storage medium storing one or more programs configured to be executed by one or more processors of a first computer system that is in communication with one or more input devices is described. In some embodiments, the one or more programs includes instructions for: detecting, via the one or more input devices, a first input; after detecting the first input, detecting, via the one or more input devices, a first air gesture; and in response to detecting the first air gesture: in accordance with a determination that the first input corresponds to a second computer system different from the first computer system, performing a first operation corresponding to the second computer system; and in accordance with a determination that the first input does not correspond to the second computer system, forgoing performing the first operation corresponding to the second computer system.

In some embodiments, a first computer system that is in communication with one or more input devices is described. In some embodiments, the first computer system that is in communication with one or more input devices comprises one or more processors and memory storing one or more programs configured to be executed by the one or more processors. In some embodiments, the one or more programs includes instructions for: detecting, via the one or more input devices, a first input; after detecting the first input, detecting, via the one or more input devices, a first air gesture; and in response to detecting the first air gesture: in accordance with a determination that the first input corresponds to a second computer system different from the first computer system, performing a first operation corresponding to the second computer system; and in accordance with a determination that the first input does not correspond to the second computer system, forgoing performing the first operation corresponding to the second computer system.

In some embodiments, a first computer system that is in communication with one or more input devices is described. In some embodiments, the first computer system that is in communication with one or more input devices comprises means for performing each of the following steps: detecting, via the one or more input devices, a first input; after detecting the first input, detecting, via the one or more input devices, a first air gesture; and in response to detecting the first air gesture: in accordance with a determination that the first input corresponds to a second computer system different from the first computer system, performing a first operation corresponding to the second computer system; and in accordance with a determination that the first input does not correspond to the second computer system, forgoing performing the first operation corresponding to the second computer system.

In some embodiments, a computer program product is described. In some embodiments, the computer program product comprises one or more programs configured to be executed by one or more processors of a first computer system that is in communication with one or more input devices. In some embodiments, the one or more programs include instructions for: detecting, via the one or more input devices, a first input; after detecting the first input, detecting, via the one or more input devices, a first air gesture; and in response to detecting the first air gesture: in accordance with a determination that the first input corresponds to a second computer system different from the first computer system, performing a first operation corresponding to the second computer system; and in accordance with a determination that the first input does not correspond to the second computer system, forgoing performing the first operation corresponding to the second computer system.

In some embodiments, a method that is performed at a first computer system that is in communication with one or more input devices is described. In some embodiments, the method comprises: detecting, via the one or more input devices, a first input; after detecting the first input, detecting, via the one or more input devices, a first air gesture; and in response to detecting the first air gesture: in accordance with a determination that the first input corresponds to a first control of a second computer system different from the first computer system, performing a first operation corresponding to a second control of the second computer system, wherein the second control is different from the first control; and in accordance with a determination that the first input does not correspond to the first control of the second computer system, forgoing performing the first operation corresponding to the second control of the second computer system.

In some embodiments, a non-transitory computer-readable storage medium storing one or more programs configured to be executed by one or more processors of a first computer system that is in communication with one or more input devices is described. In some embodiments, the one or more programs includes instructions for: detecting, via the one or more input devices, a first input; after detecting the first input, detecting, via the one or more input devices, a first air gesture; and in response to detecting the first air gesture: in accordance with a determination that the first input corresponds to a first control of a second computer system different from the first computer system, performing a first operation corresponding to a second control of the second computer system, wherein the second control is different from the first control; and in accordance with a determination that the first input does not correspond to the first control of the second computer system, forgoing performing the first operation corresponding to the second control of the second computer system.

In some embodiments, a transitory computer-readable storage medium storing one or more programs configured to be executed by one or more processors of a first computer system that is in communication with one or more input devices is described. In some embodiments, the one or more programs includes instructions for: detecting, via the one or more input devices, a first input; after detecting the first input, detecting, via the one or more input devices, a first air gesture; and in response to detecting the first air gesture: in accordance with a determination that the first input corresponds to a first control of a second computer system different from the first computer system, performing a first operation corresponding to a second control of the second computer system, wherein the second control is different from the first control; and in accordance with a determination that the first input does not correspond to the first control of the second computer system, forgoing performing the first operation corresponding to the second control of the second computer system.

In some embodiments, a first computer system that is in communication with one or more input devices is described. In some embodiments, the first computer system that is in communication with one or more input devices comprises one or more processors and memory storing one or more programs configured to be executed by the one or more processors. In some embodiments, the one or more programs includes instructions for: detecting, via the one or more input devices, a first input; after detecting the first input, detecting, via the one or more input devices, a first air gesture; and in response to detecting the first air gesture: in accordance with a determination that the first input corresponds to a first control of a second computer system different from the first computer system, performing a first operation corresponding to a second control of the second computer system, wherein the second control is different from the first control; and in accordance with a determination that the first input does not correspond to the first control of the second computer system, forgoing performing the first operation corresponding to the second control of the second computer system.

In some embodiments, a first computer system that is in communication with one or more input devices is described. In some embodiments, the first computer system that is in communication with one or more input devices comprises means for performing each of the following steps: detecting, via the one or more input devices, a first input; after detecting the first input, detecting, via the one or more input devices, a first air gesture; and in response to detecting the first air gesture: in accordance with a determination that the first input corresponds to a first control of a second computer system different from the first computer system, performing a first operation corresponding to a second control of the second computer system, wherein the second control is different from the first control; and in accordance with a determination that the first input does not correspond to the first control of the second computer system, forgoing performing the first operation corresponding to the second control of the second computer system.

In some embodiments, a computer program product is described. In some embodiments, the computer program product comprises one or more programs configured to be executed by one or more processors of a first computer system that is in communication with one or more input devices. In some embodiments, the one or more programs include instructions for: detecting, via the one or more input devices, a first input; after detecting the first input, detecting, via the one or more input devices, a first air gesture; and in response to detecting the first air gesture: in accordance with a determination that the first input corresponds to a first control of a second computer system different from the first computer system, performing a first operation corresponding to a second control of the second computer system, wherein the second control is different from the first control; and in accordance with a determination that the first input does not correspond to the first control of the second computer system, forgoing performing the first operation corresponding to the second control of the second computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for disambiguating between gestures, thereby increasing the effectiveness, efficiency, and user satisfaction with such devices. Such methods and interfaces may complement or replace other methods for disambiguating between gestures.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary methods, parameters, and the like. It should be recognized, however, that such description is not intended as a limitation on the scope of the present disclosure but is instead provided as a description of exemplary examples.

There is a need for electronic devices that provide efficient methods and interfaces for controlling devices using gestures. For example, an air gesture can cause different operations to be performed depending on which user performs the air gesture. For another example, the same air gesture can be used in different modes to either transition modes and/or change content being output. For another example, different types of moving air gestures can cause different operations to be performed. Such techniques can reduce the cognitive burden on a user using an electronic device, thereby enhancing productivity. Further, such techniques can reduce processor and battery power otherwise wasted on redundant user inputs.

Figure 1:
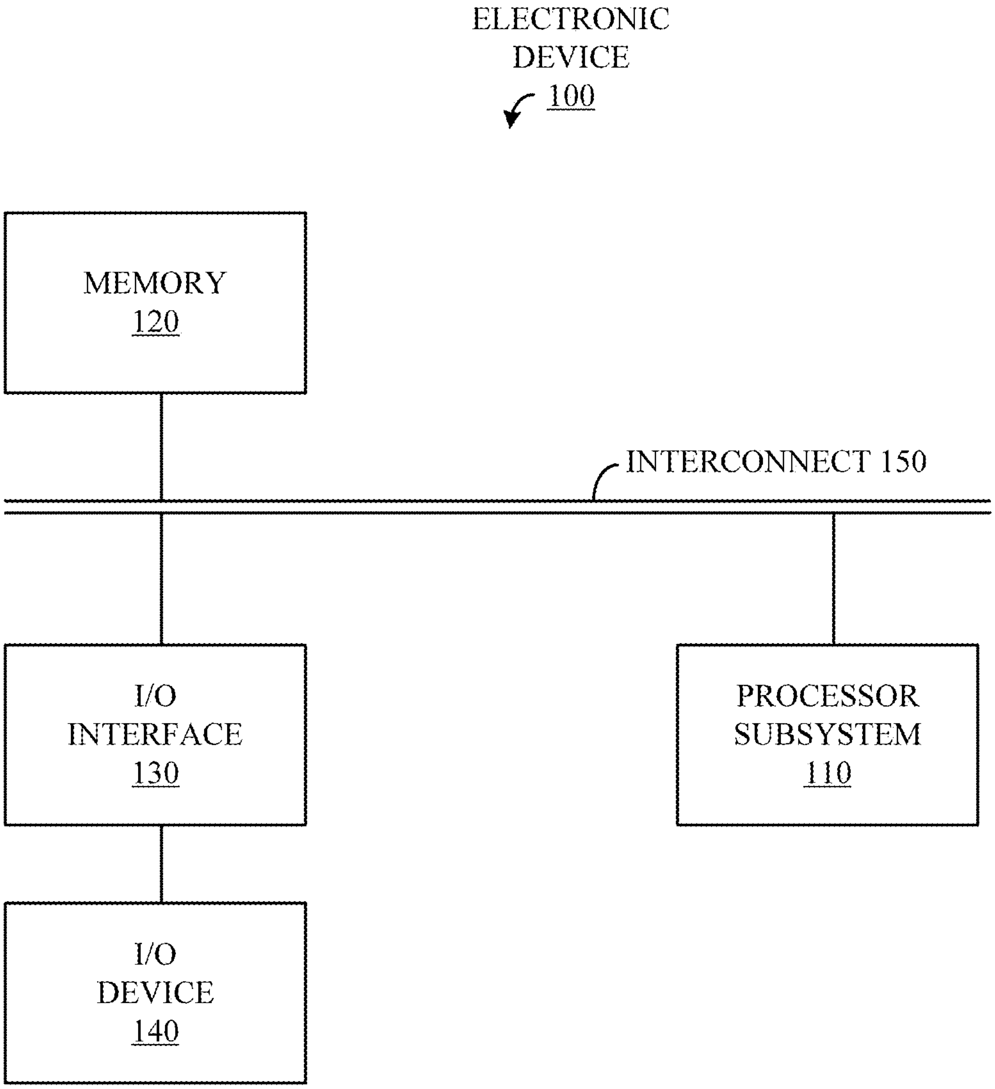
FIG. 1 is a block diagram illustrating an electronic device in accordance with some embodiments.
Figure 3:
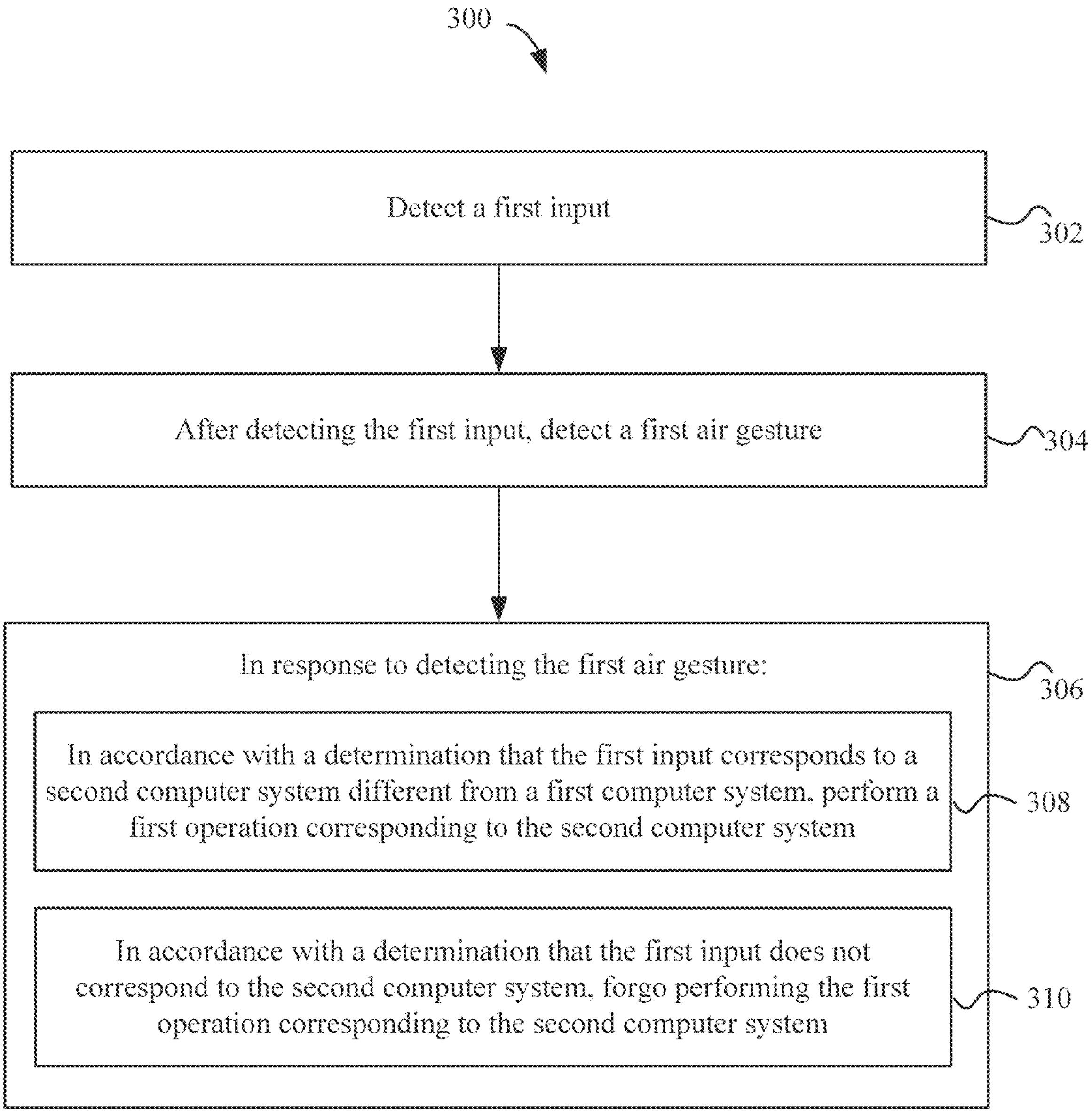
FIG. 3 is a flow diagram illustrating a method for responding to air gestures in accordance with some embodiments.
Figure 4A:
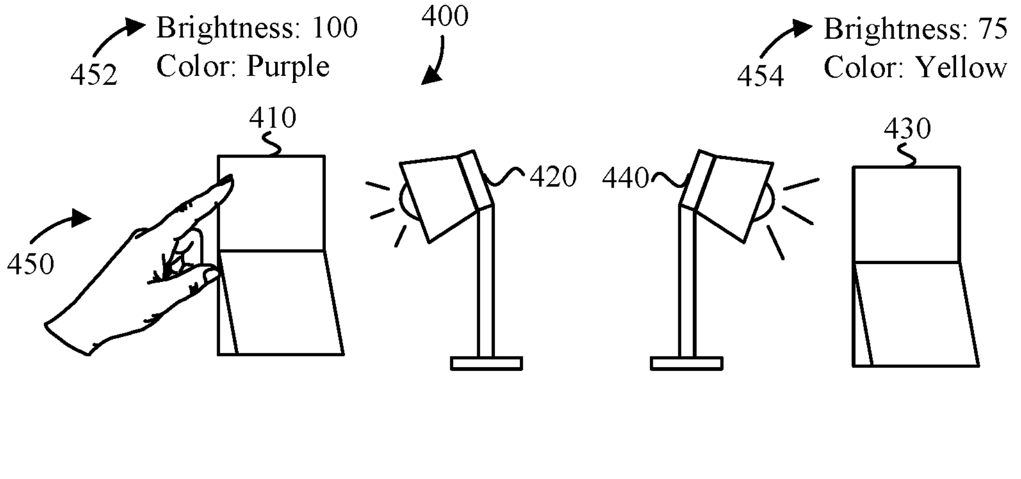
FIGS. 4A-4C illustrate techniques for responding to air gestures in accordance with some embodiments.
Figure 4B:
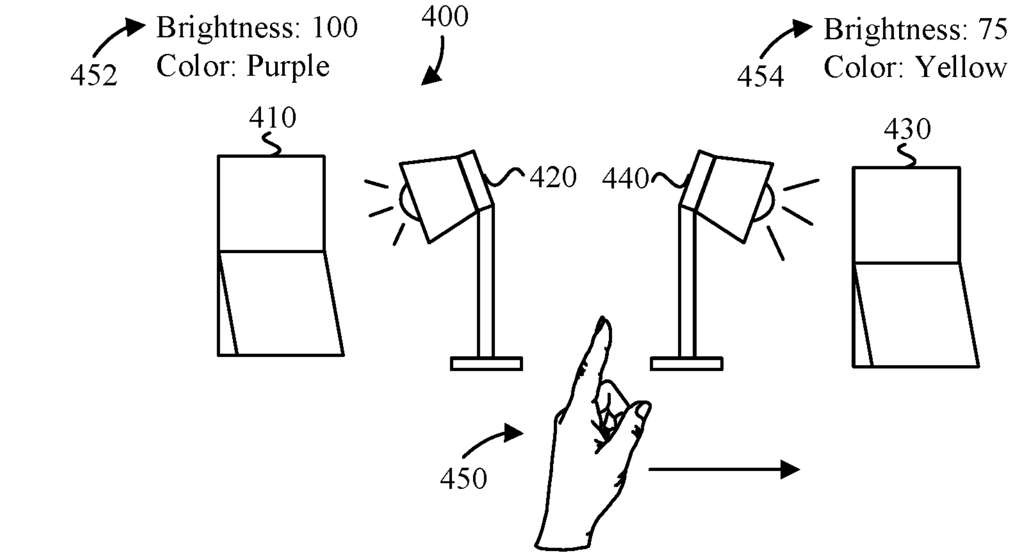
Figure 4C:
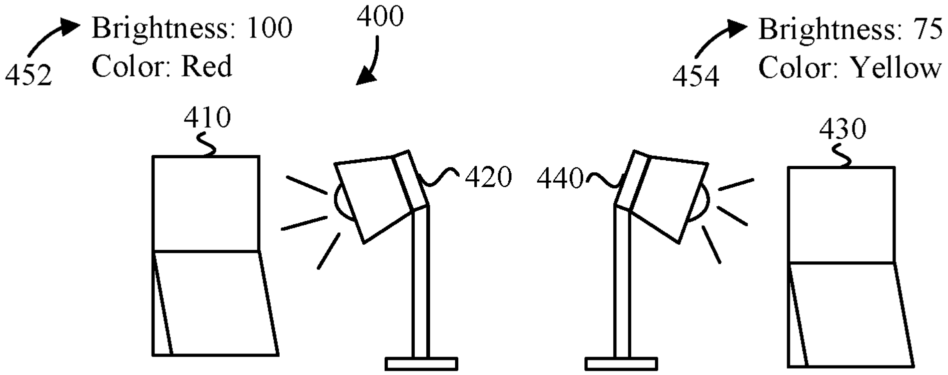
Figure 5:
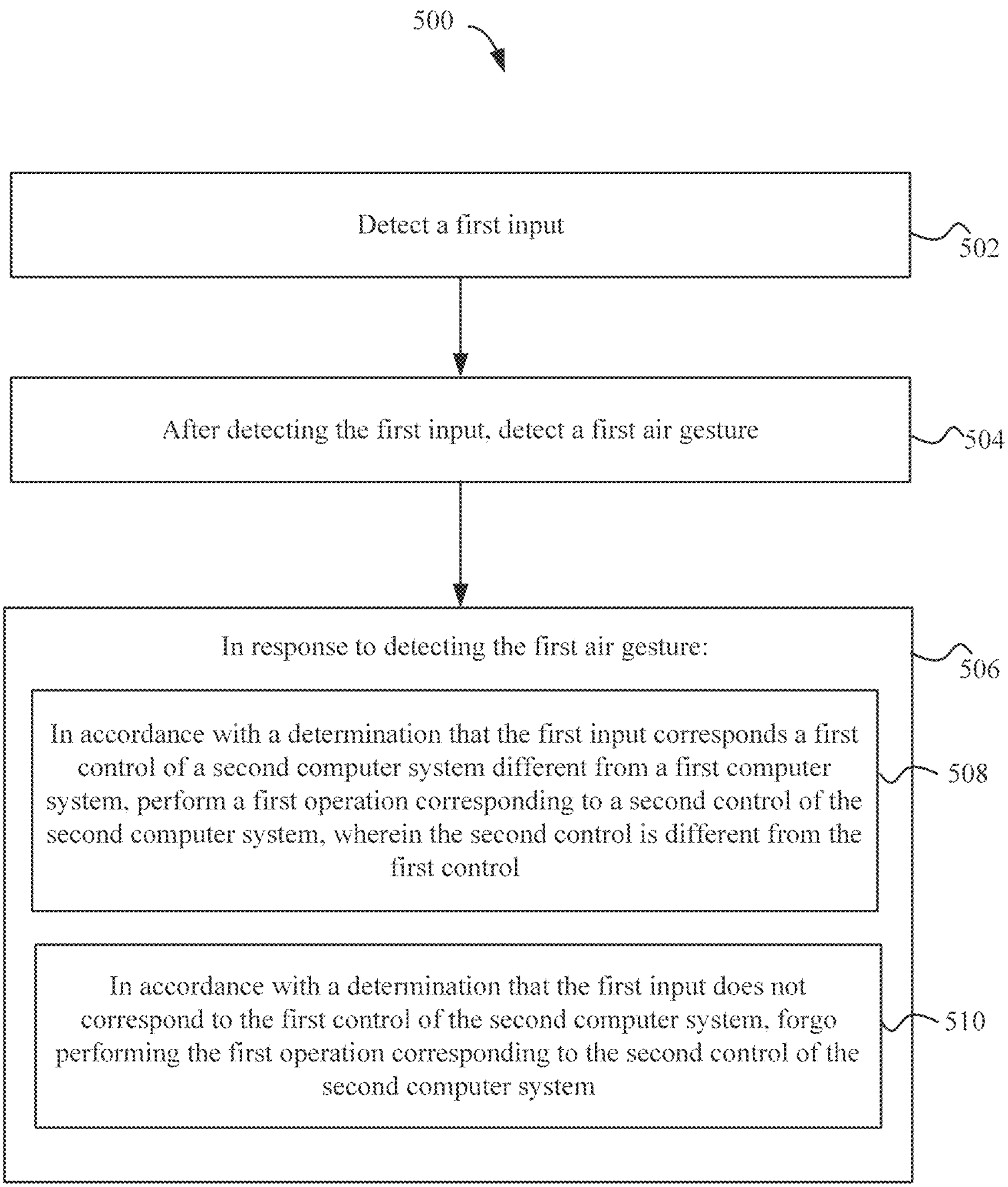
FIG. 5 is a flow diagram illustrating a method for responding to air gestures in accordance with some embodiments.

Below, FIG. 1 provides a description of an exemplary device for performing techniques for controlling devices using gestures. FIGS. 2A-2E illustrate techniques for responding to air gestures in accordance with some embodiments. FIG. 3 is a flow diagram illustrating a method for responding to air gestures in accordance with some embodiments. The user interfaces in FIGS. 2A-2E are used to illustrate the processes described below, including the processes in FIG. 3. FIGS. 4A-4C illustrate techniques for responding to the same air gesture in different contexts in accordance with some embodiments. FIG. 5 is a flow diagram illustrating a method for responding to the same air gesture in different contexts in accordance with some embodiments. The user interfaces in FIGS. 4A-4C are used to illustrate the processes described below, including the processes in FIG. 5.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Methods described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of electronic device, system, or computer readable medium claims where the electronic device, system, or computer readable medium claims include instructions for performing one or more steps that are contingent upon one or more conditions being satisfied. Because the instructions for the electronic device, system, or computer readable medium claims are stored in one or more processors and/or at one or more memory locations, the electronic device, system, or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, an electronic system, system, or computer readable storage medium can repeat the steps of a method as many times as needed to ensure that all of the contingent steps have been performed.

Although the following description uses terms "first," "second," etc. to describe various elements, these elements should not be limited by the terms. In some embodiments, these terms are used to distinguish one element from another. For example, a first device could be termed a second device, and, similarly, a second device or a device could be termed a first device, without departing from the scope of the various described examples. In some embodiments, the first device and the second device are two separate references to the same device. In some embodiments, the first device and the second device are both devices, but they are not the same device or the same type of device.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of electronic device 100 is illustrated. Electronic device 100 is a non-limiting example of an electronic device that can be used to perform functionality described herein. It should be recognized that other computer architectures of an electronic device can be used to perform functionality described herein.

In the illustrated example, electronic device 100 includes processor subsystem 110 communicating with memory 120 (e.g., a system memory) and I/O interface 130 via interconnect 150 (e.g., a system bus, one or more memory locations, or other communication channel for connecting multiple components of electronic device 100). In addition, I/O interface 130 is communicating with (e.g., wired or wirelessly) I/O device 140. In some embodiments, I/O interface 130 is included with I/O device 140 such that the two are a single component. It should be recognized that there can be one or more I/O interfaces, with each I/O interface communicating with one or more I/O devices. In some embodiments, multiple instances of processor subsystem 110 can be communicating via interconnect 150.

Electronic device 100 can be any of various types of devices, including, but not limited to, a system on a chip, a server system, a personal electronic device, a smart phone, a smart watch, a wearable device, a tablet, a laptop computer, a fitness tracking device, a head-mounted display (HMD) device, a desktop computer, an accessory (e.g., switch, light, speaker, air conditioner, heater, window cover, fan, lock, media playback device, television, and so forth), a controller, a hub, and/or a sensor. In some embodiments, a sensor includes one or more hardware components that detect information about a physical environment in proximity of (e.g., surrounding) the sensor. In some embodiments, a hardware component of a sensor includes a sensing component (e.g., an image sensor or temperature sensor), a transmitting component (e.g., a laser or radio transmitter), and/or a receiving component (e.g., a laser or radio receiver). Examples of sensors include an angle sensor, a breakage sensor such as a glass breakage sensor, a chemical sensor, a contact sensor, a non-contact sensor, a flow sensor, a force sensor, a gas sensor, a humidity or moisture sensor, an image sensor (e.g., a RGB camera and/or an infrared sensor), an inertial measurement unit, a leak sensor, a level sensor, a metal sensor, a microphone, a motion sensor, a particle sensor, a photoelectric sensor (e.g., ambient light and/or solar), a position sensor (e.g., a global positioning system), a precipitation sensor, a pressure sensor, a proximity sensor, a radiation sensor, a range or depth sensor (e.g., RADAR, LiDAR), a speed sensor, a temperature sensor, a time-of-flight sensor, a torque sensor, and an ultrasonic sensor, a vacancy sensor, an voltage and/or current sensor, and/or a water sensor. In some embodiments, sensor data is captured by fusing data from one sensor with data from one or more other sensors. Although a single electronic device is shown in FIG. 1, electronic device 100 can also be implemented as two or more electronic devices operating together.

In some embodiments, processor subsystem 110 includes one or more processors or processing units configured to execute program instructions to perform functionality described herein. For example, processor subsystem 110 can execute an operating system and/or one or more applications.

Memory 120 can include a computer readable medium (e.g., non-transitory or transitory computer readable medium) usable to store (e.g., configured to store, assigned to store, and/or that stores) program instructions executable by processor subsystem 110 to cause electronic device 100 to perform various operations described herein. For example, memory 120 can store program instructions to implement the functionality associated with method 300 described below.

Memory 120 can be implemented using different physical, non-transitory memory media, such as hard disk storage, optical drive storage, floppy disk storage, removable disk storage, removable flash drive, storage array, a storage area network (e.g., SAN), flash memory, random access memory (e.g., RAM-SRAM, EDO RAM, SDRAM, DDR SDRAM, and/or RAMBUS RAM), and/or read only memory (e.g., PROM and/or EEPROM).

I/O interface 130 can be any of various types of interfaces configured to communicate with other devices. In some embodiments, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (e.g., as described above with respect to memory 120), network interface devices (e.g., to a local or wide-area network), sensor devices (e.g., as described above with respect to sensors), a physical user-interface device (e.g., a physical keyboard, a mouse, and/or a joystick), and an auditory and/or visual output device (e.g., speaker, light, screen, and/or projector). In some embodiments, the visual output device is referred to as a display component. The display component is configured to provide visual output, such as display via an LED display or image projection. As used herein, "displaying" content includes causing to display the content (e.g., video data rendered or decoded by a display controller) by transmitting, via a wired or wireless connection, data (e.g., image data or video data) to an integrated or external display component to visually produce the content.

In some embodiments, I/O device 140 includes one or more camera sensors (e.g., one or more optical sensors and/or one or more depth camera sensors), such as for recognizing a user and/or a user's gestures (e.g., hand gestures and/or air gestures) as input. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, I/O device 140 is integrated with other components of electronic device 100. In some embodiments, I/O device 140 is separate from other components of electronic device 100. In some embodiments, I/O device 140 includes a network interface device that permits electronic device 100 to communicate with a network or other electronic devices, in a wired or wireless manner. Exemplary network interface devices include Wi-Fi, Bluetooth, NFC, USB, Thunderbolt, Ethernet, Thread, UWB, and so forth.

In some embodiments, I/O device 140 include one or more camera sensors (e.g., one or more optical sensors and/or one or more depth camera sensors), such as for tracking a user's gestures (e.g., hand gestures and/or air gestures) as input. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

Attention is now directed towards techniques that are implemented on an electronic device, such as electronic device 100.

FIGS. 2A-2E illustrate techniques for responding to air gestures in accordance with some embodiments. The user interfaces in these figures are used to illustrate the processes described below, including the processes in FIG. 3.

FIGS. 2A-2E illustrate two different computer systems (e.g., first computer system 200 and second computer system 206) selectively responding to an air gesture. For example, a user (e.g., a person) touching and/or otherwise providing attention to a computer system can cause the computer system to respond to an air gesture performed by the user instead of another computer system. In some embodiments, each of first computer system 200 and second computer system 206 is a smart phone that includes one or more components and/or features described above in relation to electronic device 100. In other embodiments, first computer system 200 and/or second computer system 206 can be another type of computer system, such as an accessory device, a desktop computer, a fitness tracking device, a head-mounted display device, a laptop, a smart blind, a smart display, a smart light, a smart lock, a smart speaker, a smart watch, a tablet, and/or a television. In some embodiments, first computer system 200 can be a different type of computer system than second computer system 206. For example, first computer system 200 can be a smart light while second computer system 206 can be a smart speaker, both able to respond to an air gesture to turn on or off.

While discussed below that a controller device detects air gestures and, in response, causes operations to be performed, it should be recognized that one or more computer systems can detect sensor data, communicate the sensor data, detect an air gesture using the sensor data, communicate an identification of the air gesture, determine an operation to perform in response to the air gesture, and/or cause an operation to be performed. For example, first computer system 200 can detect an air gesture via a camera of first computer system 200, determine that a user has previously touched first computer system 200 within a predefined period of time, and, in response, perform an operation corresponding to the air gesture. For another example, an ecosystem can include a camera for capturing content (e.g., one or more images and/or a video) corresponding to an environment, a controller device for (1) detecting an air gesture in the content and (1) causing first computer system 200 or second computer system 206 to perform an operation based on detecting the air gesture. For another example, a user can be wearing a head-mounted display device that includes a camera for capturing air gestures performed by the user. The head-mounted display device can receive content (e.g., one or more images and/or a video) from the camera, identify an air gesture in the content, and cause first computer system 200 or second computer system 206 to perform an operation based on the air gesture. For another example, a user can be wearing a smart watch that includes a gyroscope for capturing air gestures performed by the user. The smart watch can receive sensor data from the gyroscope, identify an air gesture using the sensor data, send an identification of the air gesture to another computer system (e.g., a smart phone) so that the smart phone can cause first computer system 200 or second computer system 206 to perform an operation based on the air gesture.

Figure 2A:
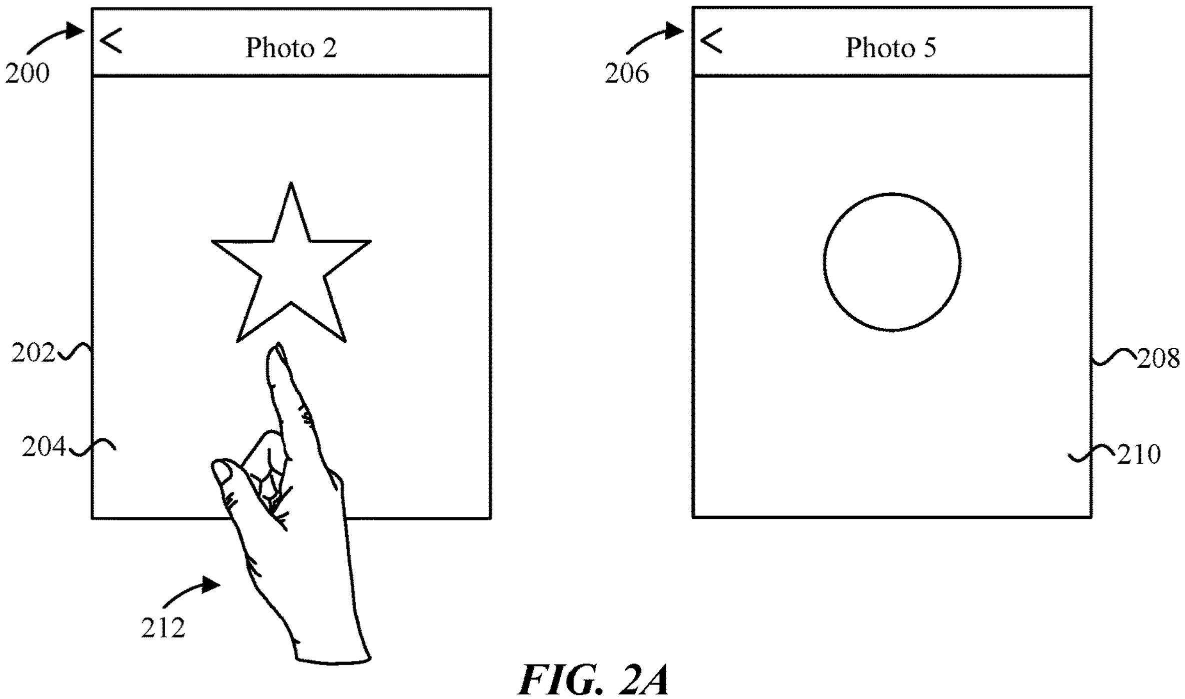
FIGS. 2A-2E illustrate techniques for responding to air gestures in accordance with some embodiments.

As illustrated in FIG. 2A, first computer system 200 displays photo user interface 202, which includes image 204 of a star titled "Photo 2." In some embodiments, photo user interface 202 is a user interface of a photo application executing on first computer system 200. The photo application can allow a user to view different photos via photo user interface 202. It should be recognized that photo user interface 202 is just one example of a user interface used with techniques described herein and that other user interfaces (e.g., a home user interface (e.g., to view a status of and/or control one or more accessories) or a music user interface (e.g., to search for and/or play one or more songs)) can use techniques described herein.

As illustrated in FIG. 2A, second computer system 206 displays photo user interface 208, which includes image 210 of a circle titled "Photo 5." Consistent with the description above, photo user interface 208 can be a user interface for a photo application executing on second computer system 206, and photo user interface 208 is just one example of a user interface used with techniques described herein. In some embodiments, first computer system 200 and second computer system 206 display different user interfaces using techniques described herein.

FIG. 2A illustrates hand 212 of a user (e.g., a person and/or a user of first computer system 200 and/or second computer system 206). In some embodiments, the user is in an environment including first computer system 200 and/or second computer system 206. As illustrated in FIG. 2A, hand 212 has a single finger extended and in a direction toward first computer system 200. In some embodiments, the single finger touches first computer system 200, such as a surface that includes display of photo user interface 202. In other embodiments, the single finger does not touch the surface but rather approaches the surface without touching the surface. It should be recognized that other types of inputs corresponding to first computer system 200 can have the same effect of hand 212 touching first computer system 200 as described below. For example, the user can look in the direction of first computer system 200 for more than a predefined period of time (e.g., 1-5 seconds). For another example, the user can press a physical button and/or otherwise provide an input directed to a button (e.g., a physical and/or virtual button) representing and/or corresponding to first computer system 200. For another example, the user can speak an identification of first computer system 200, such as saying a name corresponding to first computer system 200.

At FIG. 2A, the controller device detects (e.g., via one or more images, a physical input mechanism (such as a physical button), and/or a touch-sensitive surface) that the single finger touched first computer system 200 (e.g., a portion of first computer system 200, such as a display component, the touch-sensitive surface, and/or a component visible by a camera of the controller device). In some embodiments, first computer system 200 and/or second computer system 206 do not detect that the single finger touches first computer system 200. In other embodiments, first computer system 200 and/or second computer system 206 detect that the single finger touches first computer system 200 and communicate such information (e.g., that the single finger touched first computer system 200) to the controller device.

In some embodiments, in response to detecting that the single finger of hand 212 touched first computer system 200, the controller device initiates a mode for a predefined period of time (e.g., 1-20 seconds) after detecting that the single finger touched first computer system 200. In some embodiments, the mode causes the controller device to cause one or more air gestures (e.g., of a particular type and/or definition) detected while in the mode to be directed to first computer system 200 (e.g., as a result of the single finger touching first computer system 200 rather than second computer system 206), as discussed further below.

Figure 2B:
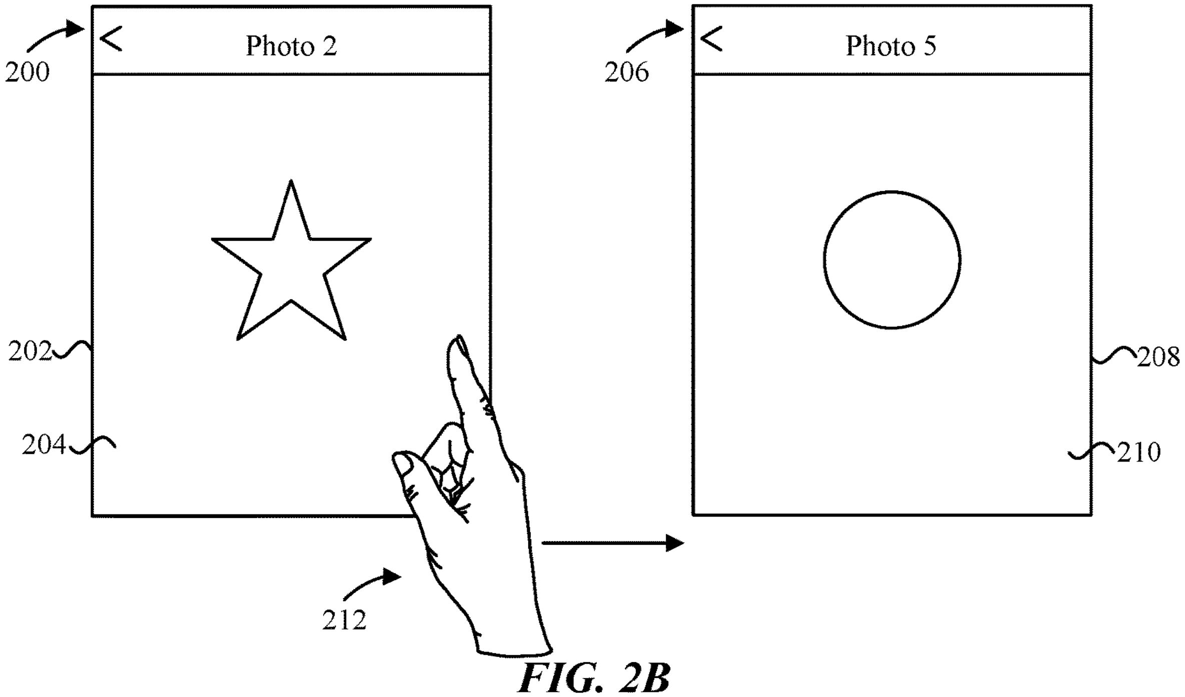

As illustrated in FIG. 2B, after detecting that the single finger of hand 212 touched first computer system 200, first computer system 200 maintains display of photo user interface 202 with image 204, and second computer system 206 maintains display of photo user interface 208 with image 210. In some embodiments, first computer system 200 and/or second computer system 206 do not modify what is displayed by each computer system respectively in response to detecting that the single finger of hand 212 touched first computer system 200. In other embodiments, first computer system 200 modifies what is displayed (e.g., displays an acknowledgement of the touch) by first computer system 200 in response to detecting that the single finger of hand 212 touched first computer system 200.

As illustrated in FIG. 2B, the controller device detects hand 212 performing a first type of air gesture (e.g., a swipe gesture) in a right direction. In some embodiments, the swipe gesture is performed in front of and/or nearby first computer system 200 and/or second computer system 206. In some embodiments, the swipe gesture is performed away from first computer system 200.

In some embodiments, the swipe gesture is an air gesture where a user extends a single finger and moves the finger from a first position (e.g., location and/or orientation) to a second position different from the first position. In some embodiments, the swipe gesture is a moving air gesture that includes a lateral (e.g., left and/or right) portion that is greater than an upward and/or downward portion of the moving air gesture. In some embodiments, one or more operations performed in response to the swipe gesture depend on a direction of the swipe gesture (e.g., the swipe gesture in one direction can cause a first operation, and the swipe gesture in another direction can cause a second operation different from the first operation). For example, the swipe gesture in the right direction (e.g., more to the right direction than to the left direction and/or more to the right direction than another direction) can cause first computer system 200 to change what content is visually output to correspond to a previous image while the swipe gesture in the left direction (e.g., more to the left direction than to the right direction and/or more to the left direction than another direction) can cause first computer system 200 to change what content is visually output to correspond to a next image or vice versa. It should be recognized that the swipe gesture can include a different movement and/or position than explicitly described in this paragraph.

Figure 2C:
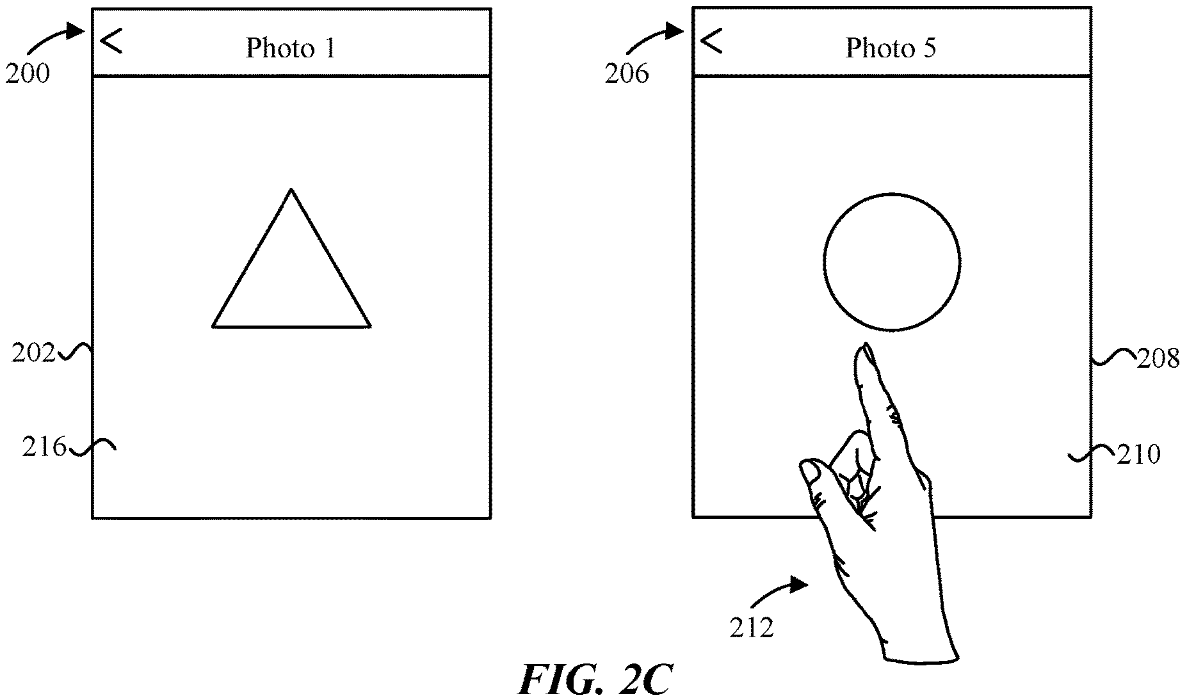

As illustrated in FIG. 2C, in response to detecting the swipe gesture in the right direction (e.g., as illustrated in FIG. 2B) (e.g., within the predefined period of time since detecting the single finger of user 212 has touched first computer system 200 and/or while the mode described above is active), first computer system 200 (1) ceases displaying image 204 and (2) displays image 216 in photo user interface 202. In some embodiments, image 204 includes a triangle and is titled "Photo 1." In some embodiments, image 216 is a previous image of the photo application (e.g., of first computer system 200) relative to image 204. It should be recognized that changing images is just one example of an operation performed in response to the swipe gesture and that one or more operations can be performed. In some embodiments, different operations are performed in response to the swipe gesture depending on which user interface is being displayed by a computer system being affected. For example, if first computer system 200 is displaying a user interface different from photo user interface 202, first computer system 200 can perform a different operation than displaying a previous image in response to detecting the swipe gesture in the right direction (e.g., as illustrated in FIG. 2B).

In some embodiments, the controller device is different from first computer system 200 and second computer system 206. For example, one or more particular types of air gestures can be determined to be directed to the controller device (e.g., and not first computer system 200 and/or second computer system 206) even when detected within the predefined period of time after detecting a touch on a computer system and/or while operating in the mode described above.

In some embodiments, one or more types of air gestures are specific to a particular computer system, such that, in response to detecting the one or more types of air gestures, the controller device determines that the one or more types of air gestures corresponds to the particular computer system (e.g., first computer system 200 and/or second computer system 206) even when detected within the predefined period of time after detecting a touch on another computer system and/or while operating in a mode corresponding to the other computer system.

In some embodiments, the controller device matches a user touching first computer system 200 with a user performing an air gesture such that the user that performed an air gesture must be the same user that touched first computer system 200 for the air gesture to be directed to first computer system 200. In such embodiments, if another user performs the air gesture illustrated in FIG. 2B without touching first computer system 200 (e.g., even while the mode described above is active), the controller device would not direct a result of detecting the air gesture to first computer system 200.

As illustrated in FIG. 2C, in response to detecting the swipe gesture in the right direction (e.g., as illustrated in FIG. 2B), second computer system 206 maintains display of photo user interface 208 with image 210. In some embodiments, the swipe gesture in the right direction (e.g., as illustrated in FIG. 2B) does not affect second computer system 206 (e.g., as a result of the controller device detecting that the single finger of hand 212 touched first computer system 200).

As illustrated in FIG. 2C, hand 212 has a single finger extended and in a direction toward second computer system 206. In some embodiments, the single finger touches second computer system 206, such as a surface that includes display of photo user interface 208. It should be recognized that alternatives discussed above with respect to touching first computer system 200 can be applied to the single finger touching second computer system 206. At FIG. 2C, the controller device detects that the single finger touches second computer system 206 (e.g., a portion of second computer system 206, such as a display component, a touch-sensitive surface, and/or another component visible by a camera of the controller device).

In some embodiments, in response to detecting that the single finger of hand 212 touched second computer system 206, the controller device initiates another mode for the predefined period of time (e.g., 1-20 seconds). In some embodiments, the other mode causes the controller device to cause one or more air gestures (e.g., of a particular type and/or definition) detected while in the mode to be directed to second computer system 206 (e.g., as a result of the single finger touching second computer system 206 rather than first computer system 200).

Figure 2D:
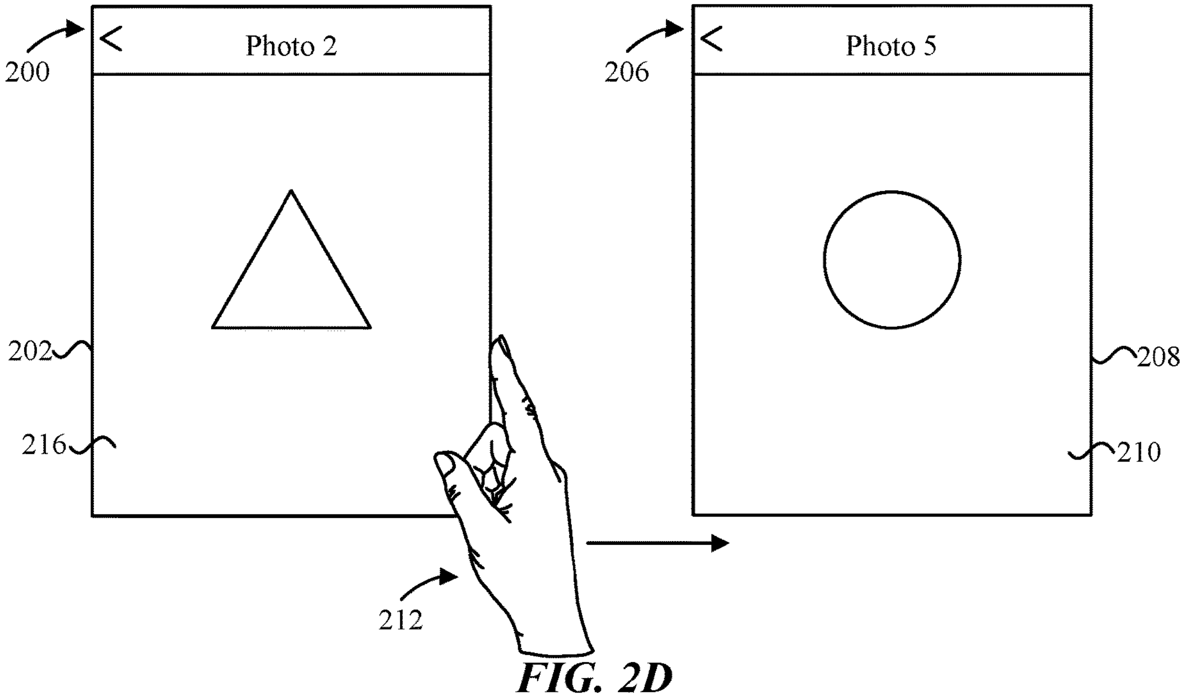

As illustrated in FIG. 2D, after detecting that the single finger of hand 212 touched second computer system 206, second computer system 206 maintains display of photo user interface 208 with image 210, and first computer system 200 maintains display of photo user interface 202 with image 216. In some embodiments, first computer system 200 and/or second computer system 206 do not modify what is displayed by each computer system respectively in response to detecting that the single finger of hand 212 touched second computer system 206. In other embodiments, second computer system 206 modifies what is displayed (e.g., displays an acknowledgement of the touch) by second computer system 206 in response to detecting that the single finger of hand 212 touched second computer system 206.

As illustrated in FIG. 2D, the controller device detects hand 212 performing the first type of air gesture (e.g., a swipe gesture) in a right direction (e.g., the same type of feature and the same direction as described above with respect to FIG. 2B). In some embodiments, the swipe gesture is performed in front of and/or nearby first computer system 200 and/or second computer system 206. In some embodiments, the swipe gesture is performed away from second computer system 206.

Figure 2E:
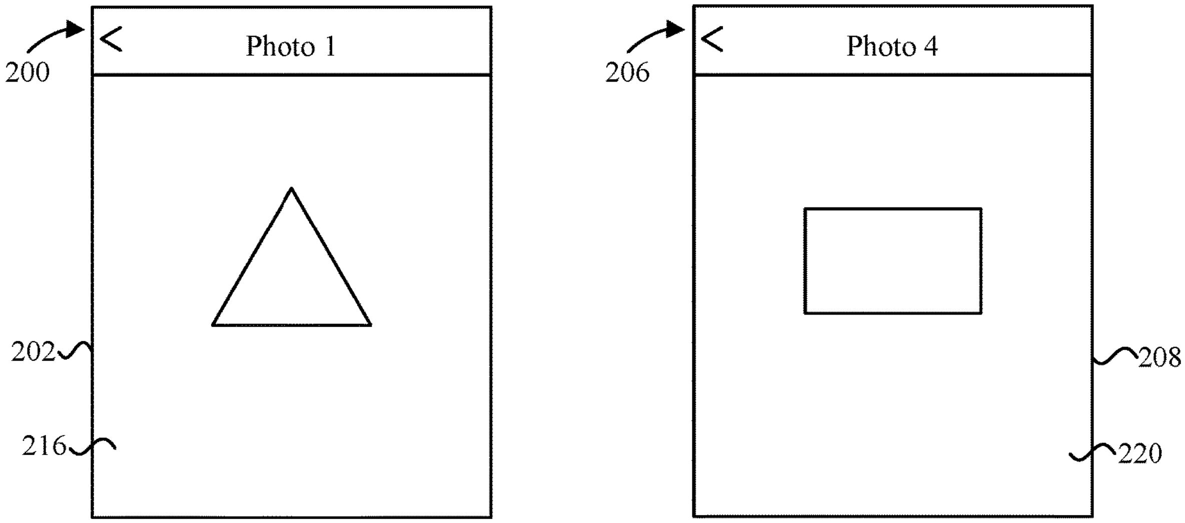

As illustrated in FIG. 2E, in response to detecting the swipe gesture in the right direction (e.g., as illustrated in FIG. 2D) (e.g., within the predefined period of time since detecting the single finger of user 212 has touched second computer system 206 and/or while the other mode described above is active), second computer system 206 (1) ceases displaying image 210 and (2) displays image 220 in photo user interface 208. In some embodiments, image 210 includes a rectangle and is titled "Photo 4." In some embodiments, image 220 is a previous image of the photo application (e.g., of second computer system 206) relative to image 210.

As illustrated in FIG. 2E, in response to detecting the swipe gesture in the right direction (e.g., as illustrated in FIG. 2D), first computer system 200 maintains display of photo user interface 202 with image 216. In some embodiments, the swipe gesture in the right direction (e.g., as illustrated in FIG. 2D) does not affect first computer system 200 (e.g., as a result of the controller device detecting that the single finger of hand 212 touched second computer system 206).

While the above discussion corresponds to detecting a single air gesture after detecting a touch of a computer system, it should be recognized that, in some embodiments, multiple air gestures are detected after detecting the touch of the computer system (and/or within the predefined period of time) (and/or while operating in a mode for detecting air gestures to be directed to the computer system), causing different operations to be performed by the computer system for each of the multiple air gestures. In other embodiments, each touch of the control is allowed a single air gesture to be performed with respect to the device, such that the control must be touched again to perform another operation with respect to the device in response to an air gesture.

FIG. 3 is a flow diagram illustrating a method (e.g., method 300) for responding to air gestures in accordance with some embodiments. Some operations in method 300 are, optionally, combined, the orders of some operations are, optionally, changed, and some operations are, optionally, omitted.

As described below, method 300 provides an intuitive way for responding to air gestures. Method 300 reduces the cognitive burden on a user for performing air gestures to perform operations, thereby creating a more efficient human-machine interface. For battery-operated computing devices, enabling a user to perform operations using air gestures faster and more efficiently conserves power and increases the time between battery charges.

In some embodiments, method 300 is performed at a first computer system (e.g., 200, 206, and/or another computer system in communication with 200 and/or 206) that is in communication with one or more input devices (e.g., a camera, a depth sensor, and/or a microphone). In some embodiments, the first computer system is an accessory, a controller, a fitness tracking device, a watch, a phone, a tablet, a processor, a head-mounted display (HMD) device, and/or a personal computing device.

The first computer system detects (302), via the one or more input devices (e.g., via one or more cameras), a first input (e.g., as described above with respect to 212 in FIGS. 2A and/or 2C) (e.g., a physical touch, a tap input, and/or a non-tap input (e.g., a verbal input, an audible request, an audible command, an audible statement, a swipe input, a hold-and-drag input, a gaze input, an air gesture, and/or a mouse click)).

After (e.g., subsequent to and/or within a predetermined period of time of) (and/or before detecting another input of the same type as the first input, such as an input directed to a different location) detecting the first input, the first computer system detects (304), via the one or more input devices (e.g., via the one or more cameras or a camera different from the one or more cameras), a first air gesture (e.g., as described above with respect to 212 in FIGS. 2B and/or 2D) (e.g., a hand input to pick up, a hand input to press, an air tap, an air swipe, and/or a clench and hold air input).

In response to (306) detecting the first air gesture, in accordance with a determination that the first input corresponds to (e.g., touches, is within a predefined distance of, and/or selects) a second computer system (e.g., 200, 206, and/or another computer system different from 200 and 206) different from the first computer system (and/or that the first air gesture was detected within a predetermined period of time of the first input) (and/or that the first air gesture was detected after detecting the first input but before detecting another input of the same type as the first input, such as an input directed to a different location), the first computer system performs (308) (e.g., based on the first air gesture and/or based on the first input) a first operation (e.g., as described above with respect to FIGS. 2D and/or 2E) corresponding to the second computer system. In some embodiments, the first air gesture is directed toward the second computer system. In some embodiments, the first air gesture is not directed toward the second computer system. In some embodiments, performing the first operation includes causing the second computer system to perform an operation corresponding to the first operation and/or sending a request for the second computer system to perform an operation corresponding to the first operation.

In response to detecting the first air gesture (306), in accordance with a determination that the first input does not correspond to the second computer system, the first computer system forgoes performing (e.g., based on the first air gesture) the first operation corresponding to the second computer system (310). In some embodiments, the first input is an input directed to the second computer system. In some embodiments, the first air gesture is directed to one or more virtual objects. Performing the first operation corresponding to the second computer system in accordance with the determination that the first input corresponds to the second computer system and/or forgoing performing the first operation corresponding to the second computer system in accordance with the determination that the first input does not correspond to the second computer system enables the first computer system to automatically perform operations if the first input was directed to the second computer system, thereby reducing the number of inputs needed to perform an operation, providing additional control options without cluttering the user interface with additional displayed controls, and/or providing improved feedback to the user.

In some embodiments, the determination that the first input corresponds to the second computer system includes a determination that the first input includes a touch input directed to a physical portion (e.g., a component and/or a housing) of the second computer system. In some embodiments, the touch input is a physical touch. In some embodiments, the touch input is a direct contact with the physical portion of the second computer system. Performing the first operation corresponding to the second computer system in accordance with a determination that the first input includes a touch input directed to a physical portion of the second computer system enables the first computer system to identify intent of a user with or without a touch-sensitive surface and automatically perform operations based on the intent, thereby reducing the number of inputs needed to perform an operation, providing additional control options without cluttering the user interface with additional displayed controls, and/or providing improved feedback to the user.

In some embodiments, in response to detecting the first air gesture and in accordance with a determination that the first input corresponds to a third computer system (e.g., 200, 206, and/or another computer system different from 200 and 206) different from the first computer system and the second computer system, the first computer system performs (e.g., based on the first air gesture) a second operation (e.g., as described above with respect to FIGS. 2C and/or 2E) corresponding to the third computer system. In some embodiments, in accordance with the determination that the first input corresponds to the third computer system, the first computer system forgoes performing the second operation corresponding to the third computer system. Performing a second operation corresponding to the third computer system in accordance with the determination that the first input corresponds to the third computer system enables the first computer system to automatically perform operations if the first input corresponds to different computer systems and not just with a single computer system, thereby reducing the number of inputs needed to perform an operation, providing additional control options without cluttering the user interface with additional displayed controls, and/or providing improved feedback to the user.

In some embodiments, in response to detecting the first air gesture and in accordance with a determination that the first input does not correspond to the first computer system and that the first input does not correspond to the second computer system (and/or that the first input does not correspond to a computer system different from the first computer system), the first computer system performs a third operation (e.g., the same as the first operation and/or a different operation from the first operation) corresponding to the first computer system. Performing a third operation corresponding to the first computer system in accordance with the determination that the first input does not correspond to the first computer system and that the first input does not correspond to the second computer system enables the first computer system to automatically perform operations if the first input does not correspond to any computer system and/or if an intent of a user is determined to not correspond to another computer system different from the first computer system, thereby reducing the number of inputs needed to perform an operation, providing additional control options without cluttering the user interface with additional displayed controls, and/or providing improved feedback to the user.

In some embodiments, after performing the first operation corresponding to the second computer system, the first computer system detects a second air gesture separate from the first air gesture, wherein the second air gesture is the same as the first air gesture (e.g., the same means, input type, and/or same gesture). In some embodiments, in response to detecting the second air gesture (and/or in accordance with a determination that the second air gesture is detected within a threshold period of time) (and/or in accordance with a determination that the first input corresponds to the second computer system), the first computer system performs a fourth operation (e.g., corresponding to the first computer system, corresponding to the second computer system, and/or corresponding to a different computer system) different from the first operation. Performing the fourth operation in response to detecting the second air gesture enables the first computer system to receive separate air gestures that are the same as the first air gesture and perform different operations, thereby reducing the number of inputs needed to perform an operation, providing additional control options without cluttering the user interface with additional displayed controls, and/or providing improved feedback to the user. In some embodiments, the fourth operation corresponds to the second computer system. In some embodiments, the fourth operation corresponds to the first computer system. In some embodiments, the fourth operation does not correspond to the second computer system.

In some embodiments, the first computer system is in communication with a display component (e.g., a projector, a display, a display screen, a touch-sensitive display, and/or a transparent display). In some embodiments, performing the first operation corresponding to the second computer system includes displaying, via the display component, a first user interface element (e.g., at least a portion of a user interface, a button, and/or a user-interface element). In some embodiments, performing the fourth operation includes displaying, via the display component, a second user interface element different from the first user interface element. Performing the fourth operation including displaying the second user interface element in response to detecting the second air gesture and performing the first operation including displaying the first user interface element enables the first computer system to automatically display different user interface elements depending on which operations are performed, thereby reducing the number of inputs needed to perform an operation and/or providing improved visual feedback to the user.

In some embodiments, after performing the first operation corresponding to the second computer system, the first computer system detects, via the one or more input devices, a third air gesture separate from the first air gesture, wherein the third air gesture is the same as the first air gesture (e.g., the same means, input type, and/or same gesture). In some embodiments, in response to detecting the third air gesture (and/or in accordance with a determination that the third air gesture is detected within a threshold period of time) (and/or in accordance with a determination that the first input corresponds to the second computer system), the first computer system performs the first operation corresponding to the second computer system. Performing the first operation corresponding to the second computer system in response to detecting the third air gesture enables the first computer system to perform the same operation repeatedly when another air gesture that is the same as the first air gesture is detected, in some embodiments, without requiring an additional input corresponding to another computer system for each additional air gesture, thereby reducing the number of inputs needed to perform an operation, providing additional control options without cluttering the user interface with additional displayed controls, and/or providing improved feedback to the user.

In some embodiments, after performing the first operation corresponding to the second computer system, the first computer system detects, via the one or more input devices, a fourth air gesture separate from the first air gesture, wherein the fourth air gesture is the same as the first air gesture (e.g., the same means, input type, and/or same gesture). In some embodiments, in response to detecting the fourth air gesture, in accordance with a determination that the fourth air gesture was detected within a threshold period of time (e.g., 0.1-3 seconds and/or 1 minute) (e.g., of the first input and/or the first air gesture), the first computer system performs the first operation corresponding to the second computer system. In some embodiments, in response to detecting the fourth air gesture, in accordance with a determination that the fourth air gesture was not performed within the threshold period of time (e.g., of the first input and/or the first air gesture), the first computer system forgoes performing the first operation corresponding to the second computer system. Performing the first operation corresponding to the second computer system based on the determination that the fourth air gesture was performed within the threshold period of time enables the first computer system to perform the same operation when different air gestures occur together in time and/or are timely, thereby reducing the number of inputs needed to perform an operation, providing additional control options without cluttering the user interface with additional displayed controls, and/or providing improved feedback to the user.

In some embodiments, after detecting the first air gesture and after forgoing performing the first operation corresponding to the second computer system, the first computer system detects, via the one or more input devices, a fifth air gesture separate from the first air gesture, wherein the fifth air gesture is the same as the first air gesture. In some embodiments, in response to detecting the fifth air gesture (and/or in accordance with a determination that a new input corresponding to (e.g., touches, is within a predefined distance of, and/or selects) the second computer system is detected within a threshold period of time of the fifth air gesture), the first computer system performs the first operation corresponding to the second computer system. In some embodiments, the first computer system performs the first operation in response to detecting the fifth air gesture regardless of a determination that the first input corresponds to the second computer system. Performing the first operation corresponding to the second computer system in response to detecting the first air gesture enables the first computer system to control the second computer system in response to additional air gestures even after not performing the operation from the first air gesture, thereby reducing the number of inputs needed to perform an operation, providing additional control options without cluttering the user interface with additional displayed controls, and/or providing improved feedback to the user.

In some embodiments, the first computer system detects, via the one or more input devices, a sixth air gesture different from the first air gesture. In some embodiments, in response to detecting the sixth air gesture, in accordance with a determination that the sixth air gesture corresponds to an input of a first type (e.g., a swipe type input, pinch type input, and/or a selection type input), the first computer system performs a fourth operation (e.g., the first operation and/or a different operation) corresponding to the second computer system. In some embodiments, in response to detecting the sixth air gesture, in accordance with a determination that the sixth air gesture corresponds to an input of a second type different from the first type, the first computer system performs a fifth operation corresponding to the second computer system. In some embodiments, in response to detecting the sixth air gesture and in accordance with a determination that the sixth air gesture does not correspond to the first type of input, the first computer system forgoes performing the fourth operation corresponding to the second computer system. In some embodiments, in response to detecting the sixth air gesture and in accordance with a determination that the sixth air gesture does not correspond to the second type of input, the first computer system forgoes performing the fifth operation corresponding to the second computer system. Performing the fourth operation or the fifth operation corresponding to the second computer system based on the determination that the sixth air gesture corresponds to an input of the first or second type enables the first computer system to perform particular operations based on the type of input detected, thereby reducing the number of inputs needed to perform an operation, providing additional control options without cluttering the user interface with additional displayed controls, and/or providing improved feedback to the user. In some embodiments, the fourth operation is different from the fifth operation. Performing the fourth operation or the fifth operation corresponding to the second computer system based on the determination that the sixth air gesture corresponds to an input of the first or second type enables the first computer system to perform different operations based on the type of input detected, thereby reducing the number of inputs needed to perform an operation, providing additional control options without cluttering the user interface with additional displayed controls, and/or providing improved feedback to the user.

In some embodiments, the first computer system detects, via the one or more input devices, a seventh air gesture separate from the first air gesture. In some embodiments, in response to detecting the seventh air gesture, in accordance with a determination that the seventh air gesture corresponds to an input of a third type (e.g., a swipe type input, pinch type input, and/or a selection type input), the first computer system performs a sixth operation (e.g., the first operation and/or a different operation) corresponding to the first computer system. In some embodiments, in response to detecting the seventh air gesture, in accordance with a determination that the seventh air gesture corresponds to an input of a fourth type different from the third type, the first computer system performs a seventh operation corresponding to the first computer system. In some embodiments, the seventh operation is different from the sixth operation. In some embodiments, in response to detecting the first air gesture and in accordance with a determination that the seventh air gesture does not correspond to an input of the third type, the first computer system forgoes performing the sixth operation. In some embodiments, in response to detecting the seventh air gesture and in accordance with a determination that the seventh air gesture does not correspond to an input of the fourth type, the first computer system forgoes performing the seventh operation. In some embodiments, in response to detecting the seventh air gesture and in accordance with a determination that the seventh air gesture corresponds to an input of another type different from the third type and/or the fourth type, the first computer system performs another operation, different from the sixth operation and/or the seventh operation, corresponding to another computer system different from the first computer system. Performing the sixth operation or the seventh operation corresponding to the first computer system based on the determination that the seventh air gesture corresponds to an input of the third type or the fourth type enables the first computer system to perform particular operations based on the type of input detected, thereby reducing the number of inputs needed to perform an operation, providing additional control options without cluttering the user interface with additional displayed control, and/or providing improved feedback to the user.

In some embodiments, the input of the third type is specific to the first computer system such that an air gesture corresponding to the input of the third type always performs an operation corresponding to the first computer system. Specific inputs of a type always performing the operation corresponding to the first computer system enables the first computer system to perform the same operation based on specific inputs, thereby reducing the number of inputs needed to perform an operation, providing additional control options without cluttering the user interface with additional displayed controls, and/or providing improved feedback to the user.

Note that details of the processes described above with respect to method 300 (e.g., FIG. 3) are also applicable in an analogous manner to other methods described herein. For example, method 500 optionally includes one or more of the characteristics of the various methods described above with reference to method 300. For example, the first input of method 500 can be the first input of method 300 such that the first input can correspond to either a computer system or a control of the computer system to perform an operation corresponding to the computer system. For brevity, these details are not repeated below.

FIGS. 4A-4C illustrate techniques for responding to air gestures in accordance with some embodiments. The user interfaces in these figures are used to illustrate the processes described below, including the processes in FIG. 5.

FIGS. 4A-4C illustrate environment 400 that includes multiple controls (e.g., first control 410 and second control 430) and multiple accessory devices (e.g., first lamp 420 and second lamp 440). While first control 410 and second control 430 are depicted as switches and first lamp 420 and second lamp 440 are depicted as lamps, it should be recognized that this is merely an example and techniques described herein can be used with more, fewer, and/or different controls (e.g., physical and/or virtual controls) and/or devices (e.g., other types of computer systems, such as a desktop computer, a fitness tracking device, a head-mounted display device, a laptop, a smart blind, a smart display, a smart light, a smart lock, a smart speaker, a smart watch, a tablet, and/or a television).

In some embodiments, a control is a mechanism directly and/or indirectly connected to (e.g., built into and/or in communication, such as wired or wireless communication, with) a computer system (e.g., an accessory device, a desktop computer, a fitness tracking device, a head-mounted display device, a laptop, a smart blind, a smart display, a smart light, a smart lock, a smart speaker, a smart watch, a tablet, and/or a television) for controlling and/or changing one or more settings of the computer system. In some embodiments, a control is separate from a computer system for which the control is configured to control and/or change one or more settings. Examples of a control include physical controls, such as a switch, a dial, a slider, a button, a touch screen, and/or a lever, and/or virtual controls, such as an interactive object displayed by a computer system. In some embodiments, only one control is established for a computer system at a time, the control configured to change one or more different settings of the computer system. In some embodiments, multiple controls are established for a computer system at a time, each control configured to change one or more different settings of the computer system.

At FIGS. 4A-4C, first control 410 is a switch that is connected to first lamp 420, and second control 430 is another switch that is connected to second lamp 440. In some embodiments, detecting an input pressing down a top half of first control 410 (e.g., as illustrated in FIG. 4A) causes first lamp 420 to turn on (e.g., and not perform another operation, such as change another setting of first lamp 420) while detecting an input pressing down a bottom half of first control 410 causes first lamp 420 to turn off (e.g., and not perform another operation, such as change another setting of first lamp 420). Similarly, detecting an input pressing down a top half of second control 430 causes second lamp 440 to turn on (e.g., and not perform another operation, such as change another setting of second lamp 440) while detecting an input pressing down a bottom half of second control 430 causes second lamp 440 to turn off (e.g., and not perform another operation, such as change another setting of second lamp 440).

Each of FIGS. 4A-4C includes attribute schematic 452 and attribute schematic 454. Attribute schematic 452 and attribute schematic 454 are included as a visual aid (and, in some embodiments, are not displayed by a computer system) that indicate a brightness level and a color of light currently output by first lamp 420 and second lamp 440, respectively. Attribute schematic 452 corresponds to first lamp 420, and attribute schematic 454 corresponds to second lamp 440. It should be recognized that more, fewer, and/or different attributes can be used, displayed, and/or relevant to techniques described herein than illustrated in attribute schematic 452 and/or attribute schematic 454.

As illustrated in FIG. 4A, attribute schematic 452 indicates that a brightness level for first lamp 420 is 100 and that a color of light currently output by first lamp 420 is purple (e.g., as indicated by the length of lines coming from first lamp 420 in FIG. 4A). As illustrated in FIG. 4A, attribute schematic 454 indicates that a brightness level for second lamp 440 is 75 and that a color of light currently output by second lamp 440 is yellow (e.g., as indicated by the length of lines coming from second lamp 440 in FIG. 4A).

While discussed below that a controller device detects air gestures and, in response, causes operations to be performed, it should be recognized that one or more computer systems can detect sensor data, communicate the sensor data, detect an air gesture using the sensor data, communicate an identification of the air gesture, determine an operation to perform in response to the air gesture, and/or cause an operation to be performed. For example, first lamp 420 can detect an air gesture via a camera of and/or in communication with first lamp 420, determine that a user has previously touched a control (e.g., first control 410) within a predefined period of time, and, in response, perform an operation corresponding to the air gesture with respect to first lamp 420. For another example, an ecosystem can include a camera for capturing content (e.g., one or more images and/or a video) corresponding to an environment, a controller device for (1) detecting an air gesture in the content and (2) causing first lamp 420 or second lamp 440 to perform an operation based on detecting the air gesture. For another example, a user can be wearing a head-mounted display device that includes a camera for capturing air gestures performed by the user. The head-mounted display device can receive content (e.g., one or more images and/or a video) from the camera, identify an air gesture in the content, and cause first lamp 420 or second lamp 440 to perform an operation based on the air gesture. For another example, a user can be wearing a smart watch that includes a gyroscope for capturing air gestures performed by the user. The smart watch can receive sensor data from the gyroscope, identify an air gesture using the sensor data, send an identification of the air gesture to another computer system (e.g., a smart phone) so that the smart phone can cause first lamp 420 or second lamp 440 to perform an operation based on the air gesture. In some embodiments, first control 410, first lamp 420, second control 430, and/or second lamp 440 are in communication with the controller device.

FIG. 4A illustrates hand 450 of a user (e.g., a person and/or a user of first control 410, first lamp 420, second control 430, and/or second lamp 440) in environment 400. As illustrated in FIG. 4A, hand 450 has a single finger extended and in a direction toward first control 410 (e.g., the top half of first control 410, which is configured, when depressed, to turn on first lamp 420). In some embodiments, the single finger touches first control 410, such as a surface of first control 410. In other embodiments, the single finger does not touch the surface but rather approaches the surface without touching the surface. It should be recognized that other types of inputs corresponding to first control 410 can have the same effect of hand 450 touching first control 410 as described below. For example, the user can look in the direction of first control 410 for more than a predefined period of time (e.g., 1-5 seconds). For another example, the user can press a physical button and/or otherwise provide an input directed to a button (e.g., a physical and/or virtual button) representing and/or corresponding to first control 410. For another example, the user can speak an identification of first control 410, such as saying a name corresponding to first control 410.

At FIG. 4A, the controller device detects (e.g., via one or more images, a physical input mechanism (such as a physical button), and/or a touch-sensitive surface) that the single finger touches first control 410 (e.g., a portion of first control 410, such as a display component, the touch-sensitive surface, and/or a component visible by a camera of the controller device). In some embodiments, first control 410 and/or first lamp 420 do not detect that the single finger touches first control 410. In other embodiments, first control 410 and/or first lamp 420 detect that the single finger touches first control 410 and communicate such information (e.g., that the single finger touched first control 410) to the controller device.

In some embodiments, in response to detecting that the single finger of hand 450 touched first control 410, the controller device initiates a mode for a predefined period of time (e.g., 1-20 seconds) after detecting that the single finger touched first control 410. In some embodiments, the mode causes the controller device to cause one or more air gestures (e.g., of a particular type and/or definition) detected while in the mode to be directed to first lamp 420 (e.g., as a result of the single finger touching first control 410 rather than first lamp 420, second control 430, and/or second lamp 440).

As illustrated in FIG. 4B, after and/or in response to detecting that the single finger of hand 450 touched first control 410, first lamp 420 maintains a brightness level at 100 and a color of light currently output by first lamp 420 at purple, and second lamp 440 maintains a brightness level at 75 and a color of light currently output by first lamp 420 at yellow. In some embodiments, one or more settings of first lamp 420 are modified in response to detecting that the single finger of hand 450 touched first control 410, such as first lamp 420 changing from an off (e.g., inactive and/or powered down) state to an on (e.g., active and/or powered on) state so as to begin outputting light.

As illustrated in FIG. 4B, the controller device detects hand 450 performing a first type of air gesture (e.g., a swipe gesture, as described above) in a right direction. In some embodiments, the swipe gesture is performed in front of and/or nearby first control 410, first lamp 420, second control 430, and/or second lamp 440. In some embodiments, the swipe gesture is performed away from first control 410 and/or first lamp 420.

As illustrated in FIG. 4C, in response to detecting the swipe gesture in the right direction (e.g., as illustrated in FIG. 4B) (e.g., within the predefined period of time since detecting the single finger has touched first control 410 and/or while the mode described above is active), first lamp 420 (1) maintains a brightness level at 100 and (2) changes a color of light currently output by first lamp 420 to red (e.g., as indicated by the length of lines coming from first lamp 420 in FIG. 4C). In some embodiments, red is a next or previous color in a list of colors. In some embodiments, the list of colors is configured for first lamp 420 (e.g., and not second lamp 440). In some embodiments, the list of colors is configured by the user corresponding to hand 450. Notably, the swipe gesture in the right direction did not turn on or off first lamp 420 even though first control 410 is configured to turn on or off first lamp 420.

It should be recognized that changing color of light output is just one example of an operation performed in response to the swipe gesture and that one or more operations can be performed. For example, the controller device can change one or more other settings of first lamp 420, display a user interface element corresponding to an operation performed (e.g., indicating that "the color of the light has changed to red"), and/or perform operations with respect to one or more other devices (e.g., when multiple devices are touched before detecting an air gesture within the predefined period of time and/or while the mode described above is active).

In some embodiments, different operations are performed in response to the swipe gesture depending on which direction the swipe gesture is directed. For example, if a swipe gesture in the left direction is detected, the controller device can change first lamp 420 to a different color than if a swipe gesture in the right direction is detected. For another example, if a swipe gesture in the upward direction is detected, the controller device can increase a brightness level of first lamp 420, and if a swipe gesture in the downward direction is detected, the controller device can decrease a brightness level of first lamp 420. For another example, if a gesture closing the fingers of hand 450 into a fist is detected, the controller device can turn off first lamp 420. In some embodiments, different operations are performed in response to different types of air gestures. For example, a swipe gesture can cause a first operation (such as increasing a brightness level) to be performed, and a tap gesture can cause a second operation (such as turning a device on or off) to be performed.

In some embodiments, detecting the same air gesture after detecting different controls of the same computer system are touched results in the same operation being performed (e.g., the operation corresponds to the air gesture performed and not to the control that is touched). For example, a lamp can include two controls: a switch to turn the lamp on or off and a dial to change brightness of the lamp. If the controller device detects the switch being touched followed by a swipe gesture in the right direction, the controller device can change a color output by the lamp (e.g., to a next color in a list). Further, if the controller device detects the dial being touched followed by a swipe gesture in the right direction, the controller device can change the color output by the lamp in the same way as when the switch had been touched (e.g., to a next color in a list).

In some embodiments, detecting the same air gesture after detecting different controls of the same computer system are touched results in different operations being performed (e.g., the operation corresponds to (but, in some embodiments, is different from) the control that is touched and/or the air gesture performed). For example, a television can include a remote control with a volume button for turning up the volume of the television and a channel button for changing a channel displayed on the television to a next channel. If the controller device detects the volume button being touched followed by a swipe gesture, the controller device can increase the volume when the swipe gesture is in an upward direction and decrease the volume when the swipe gesture is in a downward direction. Further, if the controller device detects the channel button being touched followed by a swipe gesture, the controller device can change the channel to a next channel when the swipe gesture is in an upward direction and change the channel to a previous channel when the swipe gesture is in a downward direction. For another example, a television can include a remote control with a mute button for turning off the volume of the television and a guide button for viewing a list of channels and what is currently being played on the channels. If the controller device detects the mute button being touched followed by a swipe gesture, the controller device can increase the volume when the swipe gesture is in an upward direction and decrease the volume when the swipe gesture is in a downward direction. Further, if the controller device detects the guide button being touched followed by a swipe gesture, the controller device can change the channel to a next channel when the swipe gesture is in an upward direction and change the channel to a previous channel when the swipe gesture is in a downward direction.

In some embodiments, the controller device is different from first control 410, first lamp 420, second control 430, and second lamp 440. In such embodiments, one or more particular types of air gestures can be determined to be directed to the controller device (e.g., and not first control 410, first lamp 420, second control 430, and/or second lamp 440) even when detected within the predefined period of time after detecting a touch on a control (e.g., first control 410 or second control 430) and/or while operating in the mode described above. For example, a pinch gesture can be determined to correspond to the controller device no matter if another device has been touched (e.g., within the predefined period of time and/or while the mode described above is active).

In some embodiments, one or more types of air gestures are specific to a particular computer system, such that, in response to detecting the one or more types of air gestures, the controller device determines that the one or more types of air gestures corresponds to the particular computer system (e.g., first lamp 420 or second lamp 440) even when detected within the predefined period of time after detecting a touch on a control (e.g., first control 410 or second control 430) and/or while operating in a mode corresponding to another computer system. For example, extending two fingers in an upward direction can be defined to correspond to turning off a particular television. In response to detecting the two fingers in the upward direction, the controller device can turn off the particular television if it is on and do nothing if it is off.

In some embodiments, the controller device matches a user touching first control 410 with a user performing an air gesture such that the user that performed an air gesture must be the same user that touched first control 410 for the air gesture to be directed to first lamp 420. For example, if another user performs the air gesture illustrated in FIG. 4B without touching first control 410 (e.g., even while the mode described above is active), the controller device would not direct a result of detecting the air gesture to first lamp 420.

As illustrated in FIG. 4C, in response to detecting the swipe gesture in the right direction (e.g., as illustrated in FIG. 4B), second lamp 440 maintains a brightness level at 75 and a color of light currently output by second lamp 440 at yellow. In some embodiments, the swipe gesture in the right direction (e.g., as illustrated in FIG. 4B) does not affect second lamp 440 (e.g., as a result of the controller device detecting that the single finger of hand 450 touched first control 410 and not second control 430).

While the above discussion corresponds to detecting a single air gesture after detecting a touch of a control, it should be recognized that, in some embodiments, multiple air gestures are detected after detecting the touch of the control (and/or within the predefined period of time) (and/or while operating in a mode for detecting air gestures to be directed to a device corresponding to the control), causing an operation to be performed by the device for each of the multiple air gestures. In some embodiments, each touch of the control is allowed a single air gesture to be performed with respect to the device, such that the control must be touched again to perform another operation with respect to the device in response to an air gesture. In some embodiments, each air gesture of multiple air gestures performs an operation after a single touch of a device with respect to a first set of one or operations; however, another set of one or more operations requires an individual touch of the device to perform an operation in response to an air gesture.

While discussed above with respect to touching first control 410, it should be recognized that similar operations can be performed with respect to second control 430. For example, the controller device detecting a single finger of hand 450 touching second control 430 causes one or more subsequent air gestures performed by the user with hand 450 to affect second lamp 440 (e.g., instead of first lamp 420) in a consistent manner as described above with respect to first control 410 and first lamp 420.

In some embodiments, performing the same type of air gesture after detecting a single finger of hand 450 touching different controls can cause the same operation to be performed with respect to whichever device corresponds to a control touched. For example, if a light switch for a light is touched and followed by an air gesture, the controller device can increase a brightness level of the light a first amount. If another light switch for another light is touched and followed by the same air gesture, the controller device can increase a brightness level of the other light (e.g., by the first amount or another amount different from the first amount).

In some embodiments, performing the same type of air gesture after detecting a single finger of hand 450 touching different controls can cause different operations to be performed with respect to whichever device corresponds to a control touched. For example, if a light switch for a light is touched and followed by an air gesture, the controller device can change a color of light output by the light. If another light switch for another light is touched and followed by the same air gesture, the controller device can increase a brightness level of the other light (e.g., the other light might not be able to change a color of light output by the other light and so the same air gesture performs a different operation, such as changing a brightness level).

In some embodiments, if no control is touched within the predefined period of time, air gestures can be performed with respect to the controller device instead of another device (e.g., first lamp 420 and/or second lamp 440) (e.g., the controller device initiates an operation on itself). For example, in response to detecting an air gesture without detecting a touch of a control within the predefined period of time before detecting the air gesture, the controller device can change a brightness level of a display component of the controller device rather than change a setting of another device.

FIG. 5 is a flow diagram illustrating a method (e.g., method 500) for responding to air gestures in accordance with some embodiments. Some operations in method 500 are, optionally, combined, the orders of some operations are, optionally, changed, and some operations are, optionally, omitted.

As described below, method 500 provides an intuitive way for responding to air gestures. Method 500 reduces the cognitive burden on a user for performing air gestures to perform operations, thereby creating a more efficient human-machine interface. For battery-operated computing devices, enabling a user to perform operations using air gestures faster and more efficiently conserves power and increases the time between battery charges.

In some embodiments, method 500 is performed at a first computer system (e.g., 410, 420, 430, 440, and/or another computer system different from 410, 420, 430, and 440) that is in communication with one or more input devices (e.g., a camera, a depth sensor, and/or a microphone). In some embodiments, the first computer system is an accessory, a controller, a fitness tracking device, a watch, a phone, a tablet, a processor, a head-mounted display (HMD) device, and/or a personal computing device.

The first computer system detects (502), via the one or more input devices (e.g., via one or more cameras), a first input (e.g., as described above with respect to 450 in FIG. 4A) (e.g., a tap and/or a non-tap input (e.g., a verbal input, an audible request, an audible command, an audible statement, a swipe input, a hold-and-drag input, a gaze input, an air gesture, and/or a mouse click)).

After (and/or within a predetermined period of time of) (and/or before detecting another input of the same type as the first input, such as an input directed to a different location) detecting the first input, the first computer system detects (504), via the one or more input devices (e.g., via the one or more cameras or a camera different from the one or more cameras), a first air gesture (e.g., a hand input to pick up, a hand input to press, an air tap, an air swipe, and/or a clench and hold air input).

In response to (506) detecting the first air gesture, in accordance with a determination that the first input corresponds to (e.g., touches, is within a predefined distance of, and/or selects) a first control (e.g., 410 and/or 430) (e.g., a color, a temperature, and/or a brightness) of a second computer system (e.g., 420 and/or 440) different from the first computer system (and/or that the first air gesture corresponds to the second control) (and/or that the first air gesture was detected within a predetermined period of time of the first input) (and/or that the first air gesture was detected after detecting the first input but before detecting another input of the same type as the first input, such as an input directed to a different location), the first computer system performs (508) (e.g., based on the first air gesture) a first operation (e.g., as described above with respect to 450 in FIG. 4C) corresponding to a second control (e.g., as described above with respect to FIG. 4C, such as a control that does not include a physical control in an environment including 410 and/or 430) of the second computer system, wherein the second control is different from the first control. In some embodiments, the first air gesture is directed toward the second computer system. In some embodiments, the first air gesture is not directed toward the second computer system. In some embodiments, performing the first operation includes causing the second computer system to perform an operation corresponding to the first operation and/or sending a request for the second computer system to perform an operation corresponding to the first operation. In some embodiments, the first control is separate from, different from, and/or in communication with the second computer system. In some embodiments, the second control is separate from, different from, and/or in communication with the second computer system. In some embodiments, the first input identifies the second computer system and the first air gesture identifies which control to perform an operation with respect to.

In response to (506) detecting the first air gesture, in accordance with a determination that the first input does not correspond to the first control of the second computer system, the first computer system forgoes (510) performing (e.g., based on the first air gesture) the first operation corresponding to the second control of the second computer system. Performing the first operation corresponding to a second control of the second computer system based on whether or not the determination that the first input corresponds to the first control of the second computer system enables the first computer system to automatically perform operations if the first input was directed to the first control of the second computer system, thereby reducing the number of inputs needed to perform an operation, providing additional control options without cluttering the user interface with additional displayed controls, and/or providing improved feedback to the user.

In some embodiments, the determination that the first input corresponds to the first control of the second computer system includes a determination that the first input included a touch input directed to a physical portion (e.g., a component and/or a housing) of the first control of the second computer system. In some embodiments, the touch input is a physical touch. In some embodiments, the touch input is a direct contact with the physical portion of the second computer system. Performing the first operation corresponding to a second control of the second computer system in accordance with a determination that the first input included a touch input directed to the physical portion of the second computer system enables the first computer system to (1) identify intent of a user with or without a touch-sensitive surface and automatically perform operations based on the intent and (2) perform operations based on the physical touch of the second computer system, thereby reducing the number of inputs needed to perform an operation, providing additional control options without cluttering the user interface with additional displayed controls, and/or providing improved feedback to the user.

In some embodiments, in response to detecting the first air gesture and in accordance with a determination that the first input corresponds to a third control, different from the first control, of the second computer system, the first computer system performs a second operation (e.g., as described above with respect to FIG. 4C) (e.g., the first operation and/or a different operation) corresponding to the second control of the second computer system. In some embodiments, in response to detecting the first air gesture and in accordance with a determination that the first input does not correspond to the third control, the first computer system forgoes performing the second operation corresponding to the second control of the second computer system. In some embodiments, the third control is different from the first control and the second control. Performing the second operation corresponding to the second control of the second computer system in response to detecting the first air gesture and in accordance with the determination that the first input corresponds to the third control enables the first computer system to control a particular computer system with a particular air gesture irrespective of which control of the particular computer system that corresponds to the input, thereby reducing the number of inputs needed to perform an operation, providing additional control options without cluttering the user interface with additional displayed control, and/or providing improved feedback to the user.

In some embodiments, in response to detecting the first air gesture and in accordance with a determination that the first input corresponds to a fourth control of a third computer system different from the first computer system and the second computer system, the first computer system performs a fourth operation (e.g., as described above with respect to FIG. 4C) corresponding to the third computer system. In some embodiments, in response to detecting the first air gesture and in accordance with a determination that the first input does not correspond to the fourth control of the third computer system, the first computer system forgoes performing the fourth operation corresponding to the third computer system. In some embodiments, the fourth operation corresponding to the third computer system includes a fourth operation corresponding to a fifth control of the third computer system. In some embodiments, the fifth control is different from the fourth control. Performing the fourth operation corresponding to the third computer system in response to detecting the first air gesture and in accordance with a determination that the first input corresponds to a fourth control of a third computer system enables the first computer system to control different computer systems based on which control the input corresponds to, thereby reducing the number of inputs needed to perform an operation, providing additional control options without cluttering the user interface with additional displayed controls, and/or providing improved feedback to the user.

In some embodiments, the fourth operation corresponds to a control of a first type (e.g., changing brightness, turning on and/or off, and/or changing a color). In some embodiments, in response to detecting the first air gesture and in accordance with a determination that the first input corresponds to a first control of a fourth computer system different from the first computer system, the second computer system, and the third computer system, the first computer system performs the fourth operation (e.g., as described above with respect to FIG. 4C) corresponding to the fourth computer system. Performing the fourth operation corresponding to the fourth computer system in response to detecting the first air gesture and in accordance with a determination that the first input corresponds to a first control of a fourth computer system enables the first computer system to perform the same operation (e.g., modify the same type of control) on different computer systems in response to the same air gesture depending on a previous input, thereby reducing the number of inputs needed to perform an operation, providing additional control options without cluttering the user interface with additional displayed controls, and/or providing improved feedback to the user.

In some embodiments, in response to detecting the first air gesture, in accordance with a determination that the first input does not correspond to the first control of the second computer system and does not correspond to the second computer system (and/or that the first input does not correspond to a computer system different from the first computer system), the first computer system performs a fifth operation (e.g., as described above with respect to FIG. 4C) corresponding to the first computer system. In some embodiments, in accordance with a determination that the first input corresponds to the first computer system, the first computer system performs the fifth operation corresponding to the first computer system. Performing the fifth operation corresponding to the first computer system in accordance with the determination that the first input does not correspond to the first control of the second computer system and does not correspond to the second computer system enables the first computer system to control other computer systems or itself based on the input received, thereby reducing the number of inputs needed to perform an operation, providing additional control options without cluttering the user interface with additional displayed controls, and/or providing improved feedback to the user.

In some embodiments, after performing the first operation corresponding to the second control of the second computer system, the first computer system detects, via the one or more input devices, a second air gesture (e.g., as described above with respect to FIG. 4C) separate from the first air gesture, wherein the second air gesture is the same as the first air gesture. In some embodiments, in response to detecting the second air gesture, the first computer system performs a sixth operation (e.g., as described above with respect to FIG. 4C) different from the first operation. Performing a sixth operation in response to detecting the second air gesture enables the first computer system to perform different operations with subsequent air gestures, thereby reducing the number of inputs needed to perform an operation, providing additional control options without cluttering the user interface with additional displayed controls, and/or providing improved feedback to the user. In some embodiments, the sixth operation corresponds to the second computer system. In some embodiments, the sixth operation corresponds to the first control of the second computer system. In some embodiments, the sixth operation corresponds to the first computer system. In some embodiments, the sixth operation corresponds to the first computer system and not the second computer system.

In some embodiments, the first computer system is in communication with a display component (e.g., a projector, a display, a display screen, a touch-sensitive display, and/or a transparent display). In some embodiments, performing the first operation corresponding to the second control of the second computer system includes displaying, via the display component, a first user interface element (e.g., at least a portion of a user interface, a button, and/or a user-interface element). In some embodiments, performing the sixth operation includes displaying, via the display component, a second user interface element different from the first user interface element. Displaying different user interface elements in response to detecting an air gesture depending on which control that a previous input corresponds to enables the first computer system to indicate what is occurring when different computer systems are performing operations, thereby reducing the number of inputs needed to perform an operation and/or providing improved visual feedback to the user.

In some embodiments, after performing the first operation corresponding to the second control of the second computer system, the first computer system detects a third air gesture (e.g., as described above with respect to FIG. 4C) separate from the first air gesture, wherein the third air gesture is the same as the first air gesture. In some embodiments, in response to detecting the third air gesture (and/or in accordance with a determination that the third air gesture is within a threshold amount of time from detecting the first air gesture and/or the first input), the first computer system performs the first operation (e.g., as described above with respect to FIG. 4C) corresponding to the second control of the second computer system. Performing the first operation corresponding to the second control of the second computer system in response to detecting the third air gesture enables the first computer system to perform the same operation after subsequent air gestures, enabling a user to provide repeated actions, in some embodiments, without requiring an additional input corresponding to another computer system for each additional air gesture, thereby reducing the number of inputs needed to perform an operation, providing additional control options without cluttering the user interface with additional displayed controls, and/or providing improved feedback to the user.

In some embodiments, after performing the first operation corresponding to the second control of the second computer system, the first computer system detects, via the one or more input devices, a fourth air gesture. In some embodiments, in response to detecting the fourth air gesture, in accordance with a determination that the fourth air gesture was detected within a threshold period of time (e.g., 0.1-3 seconds, or 90 seconds) (e.g., of the first input and/or the first air gesture), the first computer system performs a seventh operation corresponding to the second computer system. In some embodiments, in response to detecting the fourth air gesture, in accordance with a determination that the fourth air gesture was not detected within the threshold period of time (e.g., of the first input and/or the first air gesture), the first computer system forgoes performing the seventh operation corresponding to the second computer system. In some embodiments, the seventh operation is different from the first operation. In some embodiments, the seventh operation is separate from the first operation, wherein the seventh operation is the same as the first operation. In some embodiments, performing the seventh operation corresponding to the second computer system includes performing the seventh operation corresponding to the first control of the second computer system. Performing the seventh operation based on the determination that the fourth gesture was detected within the threshold period of time enables the first computer system to automatically perform the same operation when different air gestures occur together in time and/or are timely, thereby reducing the number of inputs needed to perform an operation, providing additional control options without cluttering the user interface with additional displayed controls, and/or providing improved feedback to the user.

In some embodiments, after detecting the first air gesture and after forgoing performing the first operation corresponding to the second control of the second computer system, the first computer system detects a fifth air gesture separate from the first air gesture, wherein the fifth air gesture is the same as the first air gesture. In some embodiments, in response to detecting the fifth air gesture (and/or in accordance with a determination that a new input corresponding to (e.g., touches, is within a predefined distance of, and/or selects) the second computer system and/or the second control of the second computer system is detected within a threshold period of time of the fifth air gesture), the first computer system performs an eighth operation corresponding to the second computer system. In some embodiments, the eighth operation is different from the first operation. In some embodiments, the eighth operation is separate from the first operation, wherein the eighth operation is the same as the first operation. In some embodiments, performing the eighth operation corresponding to the second computer system includes performing the eighth operation corresponding to the first control of the second computer system. Performing the eighth operation corresponding to the second computer system in response to detecting the fifth air gesture enables the first computer system to perform an operation corresponding to the second computer system from an air gesture even after not performing an operation corresponding to the second computer system from a previous air gesture, thereby reducing the number of inputs needed to perform an operation, providing additional control options without cluttering the user interface with additional displayed controls and/or providing improved feedback to the user.

In some embodiments, after detecting the first air gesture, the first computer system detects, via the one or more input devices, a sixth air gesture different from the first air gesture. In some embodiments, in response to detecting the sixth air gesture, in accordance with a determination that the sixth air gesture corresponds to an input of a first type, the first computer system performs a ninth operation corresponding to a sixth control of the second computer system. In some embodiments, in response to detecting the sixth air gesture, in accordance with a determination that the sixth air gesture corresponds to an input of a second type, the first computer system performs a tenth operation corresponding to a seventh control, different from the sixth control, of the second computer system, wherein the tenth operation is different from the ninth operation. In some embodiments, the ninth operation is different from the first operation. In some embodiments, the ninth operation is separate from the first operation and the same as the first operation. In some embodiments, the tenth operation is different from the first operation. In some embodiments, the tenth operation is separate from the first operation and the same as the first operation. In some embodiments, in accordance with a determination that the sixth air gesture does not correspond to an input of the first type and the second type, the first computer system forgoes performing the ninth operation and/or the tenth operation. Performing the ninth operation or the tenth operation corresponding to a different control based on the determination that a gesture corresponds to an input of a type enables the first computer system to perform different operations corresponding to different controls based on the type of gesture detected, thereby reducing the number of inputs needed to perform an operation, providing additional control options without cluttering the user interface with additional displayed controls, and/or providing improved feedback to the user.

In some embodiments, the first control is a virtual control (e.g., an object with an appearance of a control, an object that is displayed with an indication that controlling, picking up, and/or grabbing one or more operations will configure the computer system to operate in a different state (e.g., as a state in which detection of an air input causes the computer system to perform an operation and/or a state at which the computer system was not in before the object was controlled)). In some embodiments, the first control is a physical control (e.g., 410 and/or 430) (e.g., a remote, a gamepad, and/or a controller).

Note that details of the processes described above with respect to method 500 (e.g., FIG. 5) are also applicable in an analogous manner to the methods described herein. For example, method 300 optionally includes one or more of the characteristics of the various methods described above with reference to method 500. For example, the second computer system of method 500 can be the second computer system of method 300 such that an operation that is performed depends on what a first input corresponds to. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The operations described above can be performed using various ecosystems of devices. Conceptually, a source device obtains and delivers data representing the environment to a decision controller. In the foregoing examples, for instance, an accessory device in the form of a camera acts as a source device by providing camera output about the environments described above with respect to FIGS. 2A-2E and 4A-4C. The camera output can be provided to a controller device with sufficient computation power to process the incoming information and generate instructions for other devices in the environment. Examples of electronic devices having sufficient computational power to act as controllers include a smart phone, a smart watch, a smart display, a tablet, a laptop, and/or a desktop computer. Controller functionality may also be integrated into devices that have other primary functionalities, such as a media playback device, a smart speaker, a tabletop dock or smart screen, and/or a television. Source devices, such as the camera, can in some instances have sufficient computational power to act as controller devices. It should be appreciated that computational power generally represents a design choice that is balanced with power consumption, packaging, and/or cost. For example, a source device that is wired to main electricity may be more likely to take on controller device functionality than a battery-powered device, even though both are possible. The controller device, upon determining a decision based on the obtained sensor output, provides instructions to be processed by one or more other devices in the environment (e.g., first computer system 200). In the foregoing examples, the controller device (1) sends identifications of air gestures to different computer systems (e.g., first computer system 200 and/or second computer system 206) and/or (2) causes a lamp to change color that is being output.

The various ecosystems of devices described above can connect and communicate with one another using various communication configurations. Some exemplary configurations involve direct communications such as device-to-device connections. For example, a source device (e.g., camera) can capture images of an environment, determine an air gesture performed by a particular user and, acting as a controller device, determine to send an instruction to a computer system to change states. The connection between the source device and the computer system can be wired or wireless. The connection can be a direct device-to-device connection such as Bluetooth. Some exemplary configurations involve mesh connections. For example, a source device may use a mesh connection such as Thread to connect with other devices in the environment. Some exemplary configurations involve local and/or wide area networks and may employ a combination of wired (e.g., Ethernet) and wireless (e.g., Wi-Fi, Bluetooth, Thread, and/or UWB) connections. For example, a camera may connect locally with a controller hub in the form of a smart speaker, and the smart speaker may relay instructions remotely with a smart phone, over a cellular or Internet connection.

As described above, the present technology contemplates the gathering and use of data available from various sources, including cameras, to improve interactions with connected devices. In some instances, these sources may include electronic devices situated in an enclosed space such as a room, a home, a building, and/or a predefined area. Cameras and other connected smart devices offer potential benefit to users. For example, security systems often incorporate cameras and other sensors. Accordingly, the use of smart devices enables users to have calculated control of benefits, include detecting air gestures, in their environment. Other uses for sensor data that benefit the user are also contemplated by the present disclosure. For instance, health data may be used to provide insights into a user's general wellness.

Entities responsible for implementing, collecting, analyzing, disclosing, transferring, storing, or otherwise using camera images or other data containing personal information should comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, camera images or personal information data. For example, in the case of device control services, the present technology can be configured to allow users to select to "opt in" or "opt out" of participation during registration for services or anytime thereafter. In another example, users can selectively enable certain device control services while disabling others. For example, a user may enable detecting air gestures with depth sensors but disable camera output.

Implementers may also take steps to anonymize sensor data. For example, cameras may operate at low resolution for automatic object detection and capture at higher resolutions upon explicit user instruction. Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., name and location), controlling the amount or specificity of data stored (e.g., collecting location data a city level rather than at an address level), controlling how data is stored (e.g., aggregating data across users), and/or other methods.

What is claimed is:

1. A method, comprising:

at a first computer system that is in communication with one or more input devices:

detecting, via the one or more input devices, a first input;

after detecting the first input, detecting, via the one or more input devices, a first air gesture; and in response to detecting the first air gesture:

in accordance with a determination that the first input corresponds to selection of a second computer system before detecting the first air gesture, performing a first operation corresponding to the second computer system, wherein the second computer system is different from the first computer system; and in accordance with a determination that the first input does not correspond to selection of the second computer system, forgoing performing the first operation corresponding to the second computer system.

2. The method of claim 1, wherein the determination that the first input corresponds to selection of the second computer system before detecting the first air gesture includes a determination that the first input includes a touch input directed to a physical portion of the second computer system.

3. The method of claim 1, further comprising:

in response to detecting the first air gesture and in accordance with a determination that the first input corresponds to selection of a third computer system before detecting the first air gesture, performing a second operation corresponding to the third computer system, wherein the third computer system is different from the first computer system and the second computer system.

4. The method of claim 1, further comprising:

in response to detecting the first air gesture and in accordance with a determination that the first input does not correspond to selection of the first computer system and that the first input does not correspond to selection of the second computer system, performing a third operation corresponding to the first computer system.

5. The method of claim 1, further comprising:

after performing the first operation corresponding to the second computer system, detecting a second air gesture separate from the first air gesture, wherein the second air gesture is the same as the first air gesture; and in response to detecting the second air gesture, performing a fourth operation different from the first operation.

6. The method of claim 5, wherein the fourth operation corresponds to the second computer system.

7. The method of claim 5, wherein the fourth operation corresponds to the first computer system.

8. The method of claim 5, wherein:

the first computer system is in communication with a display component;

performing the first operation corresponding to the second computer system includes displaying, via the display component, a first user interface element; and performing the fourth operation includes displaying, via the display component, a second user interface element different from the first user interface element.

9. The method of claim 1, further comprising:

after performing the first operation corresponding to the second computer system, detecting, via the one or more input devices, a third air gesture separate from the first air gesture, wherein the third air gesture is the same as the first air gesture; and in response to detecting the third air gesture, performing the first operation corresponding to the second computer system.

10. The method of claim 1, further comprising:

after performing the first operation corresponding to the second computer system, detecting, via the one or more input devices, a fourth air gesture separate from the first air gesture, wherein the fourth air gesture is the same as the first air gesture; and in response to detecting the fourth air gesture:

in accordance with a determination that the fourth air gesture was detected within a threshold period of time, performing the first operation corresponding to the second computer system; and in accordance with a determination that the fourth air gesture was not performed within the threshold period of time, forgoing performing the first operation corresponding to the second computer system.

11. The method of claim 1, further comprising:

after detecting the first air gesture and after forgoing performing the first operation corresponding to the second computer system, detecting, via the one or more input devices, a fifth air gesture separate from the first air gesture, wherein the fifth air gesture is the same as the first air gesture; and in response to detecting the fifth air gesture, performing the first operation corresponding to the second computer system.

12. The method of claim 1, further comprising:

detecting, via the one or more input devices, a sixth air gesture different from the first air gesture; and in response to detecting the sixth air gesture:

in accordance with a determination that the sixth air gesture corresponds to an input of a first type, performing a fourth operation corresponding to the second computer system; and in accordance with a determination that the sixth air gesture corresponds to an input of a second type different from the first type, performing a fifth operation corresponding to the second computer system.

13. The method of claim 12, wherein the fourth operation is different from the fifth operation.

14. The method of claim 1, further comprising:

detecting, via the one or more input devices, a seventh air gesture separate from the first air gesture; and in response to detecting the seventh air gesture:

in accordance with a determination that the seventh air gesture corresponds to an input of a third type, performing a sixth operation corresponding to the first computer system; and in accordance with a determination that the seventh air gesture corresponds to an input of a fourth type different from the third type, performing a seventh operation corresponding to the first computer system.

15. The method of claim 14, wherein the input of the third type is specific to the first computer system such that an air gesture corresponding to the input of the third type always performs an operation corresponding to the first computer system.

16. A non-transitory computer-readable storage medium storing one or more programs configured to be executed by one or more processors of a first computer system that is in communication with one or more input devices, the one or more programs including instructions for:

detecting, via the one or more input devices, a first input;

after detecting the first input, detecting, via the one or more input devices, a first air gesture; and in response to detecting the first air gesture:

in accordance with a determination that the first input corresponds to selection of a second computer system before detecting the first air gesture, performing a first operation corresponding to the second computer system, wherein the second computer system is different from the first computer system; and in accordance with a determination that the first input does not correspond to selection of the second computer system, forgoing performing the first operation corresponding to the second computer system.

17. A first computer system that is in communication with one or more input devices, comprising:

one or more processors; and memory storing one or more programs configured to be executed by the one or more processors, the one or more programs including instructions for:

detecting, via the one or more input devices, a first input;

after detecting the first input, detecting, via the one or more input devices, a first air gesture; and in response to detecting the first air gesture:

in accordance with a determination that the first input corresponds to selection of a second computer system before detecting the first air gesture, performing a first operation corresponding to the second computer system, wherein the second computer system is different from the first computer system; and in accordance with a determination that the first input does not correspond to selection of the second computer system, forgoing performing the first operation corresponding to the second computer system.

18. The non-transitory computer-readable storage medium of claim 16, wherein the determination that the first input corresponds to selection of the second computer system before detecting the first air gesture includes a determination that the first input includes a touch input directed to a physical portion of the second computer system.

19. The non-transitory computer-readable storage medium of claim 16, the one or more programs further including instructions for:

in response to detecting the first air gesture and in accordance with a determination that the first input corresponds to selection of a third computer system before detecting the first air gesture, performing a second operation corresponding to the third computer system, wherein the third computer system is different from the first computer system and the second computer system.

20. The non-transitory computer-readable storage medium of claim 16, the one or more programs further including instructions for:

in response to detecting the first air gesture and in accordance with a determination that the first input does not correspond to selection of the first computer system and that the first input does not correspond to selection of the second computer system, performing a third operation corresponding to the first computer system.

21. The non-transitory computer-readable storage medium of claim 16, the one or more programs further including instructions for:

after performing the first operation corresponding to the second computer system, detecting a second air gesture separate from the first air gesture, wherein the second air gesture is the same as the first air gesture; and in response to detecting the second air gesture, performing a fourth operation different from the first operation.

22. The non-transitory computer-readable storage medium of claim 21, wherein the fourth operation corresponds to the second computer system.

23. The non-transitory computer-readable storage medium of claim 21, wherein the fourth operation corresponds to the first computer system.

24. The non-transitory computer-readable storage medium of claim 16, wherein:

the first computer system is in communication with a display component;

performing the first operation corresponding to the second computer system includes displaying, via the display component, a first user interface element; and performing the fourth operation includes displaying, via the display component, a second user interface element different from the first user interface element.

25. The non-transitory computer-readable storage medium of claim 16, the one or more programs further including instructions for:

after performing the first operation corresponding to the second computer system, detecting, via the one or more input devices, a third air gesture separate from the first air gesture, wherein the third air gesture is the same as the first air gesture; and in response to detecting the third air gesture, performing the first operation corresponding to the second computer system.

26. The non-transitory computer-readable storage medium of claim 16, the one or more programs further including instructions for:

after performing the first operation corresponding to the second computer system, detecting, via the one or more input devices, a fourth air gesture separate from the first air gesture, wherein the fourth air gesture is the same as the first air gesture; and in response to detecting the fourth air gesture:

in accordance with a determination that the fourth air gesture was detected within a threshold period of time, performing the first operation corresponding to the second computer system; and in accordance with a determination that the fourth air gesture was not performed within the threshold period of time, forgoing performing the first operation corresponding to the second computer system.

27. The non-transitory computer-readable storage medium of claim 16, the one or more programs further including instructions for:

after detecting the first air gesture and after forgoing performing the first operation corresponding to the second computer system, detecting, via the one or more input devices, a fifth air gesture separate from the first air gesture, wherein the fifth air gesture is the same as the first air gesture; and in response to detecting the fifth air gesture, performing the first operation corresponding to the second computer system.

28. The non-transitory computer-readable storage medium of claim 16, the one or more programs further including instructions for:

detecting, via the one or more input devices, a sixth air gesture different from the first air gesture; and in response to detecting the sixth air gesture:

in accordance with a determination that the sixth air gesture corresponds to an input of a first type, performing a fourth operation corresponding to the second computer system; and in accordance with a determination that the sixth air gesture corresponds to an input of a second type different from the first type, performing a fifth operation corresponding to the second computer system.

29. The non-transitory computer-readable storage medium of claim 28, wherein the fourth operation is different from the fifth operation.

30. The non-transitory computer-readable storage medium of claim 16, the one or more programs further including instructions for:

detecting, via the one or more input devices, a seventh air gesture separate from the first air gesture; and in response to detecting the seventh air gesture:

in accordance with a determination that the seventh air gesture corresponds to an input of a third type, performing a sixth operation corresponding to the first computer system; and in accordance with a determination that the seventh air gesture corresponds to an input of a fourth type different from the third type, performing a seventh operation corresponding to the first computer system.

31. The non-transitory computer-readable storage medium of claim 30, wherein the input of the third type is specific to the first computer system such that an air gesture corresponding to the input of the third type always performs an operation corresponding to the first computer system.

32. The computer system of claim 17, wherein the determination that the first input corresponds to selection of the second computer system before detecting the first air gesture includes a determination that the first input includes a touch input directed to a physical portion of the second computer system.

33. The computer system of claim 17, the one or more programs further including instructions for:

in response to detecting the first air gesture and in accordance with a determination that the first input corresponds to selection of a third computer system before detecting the first air gesture, performing a second operation corresponding to the third computer system, wherein the third computer system is different from the first computer system and the second computer system.

34. The computer system of claim 17, the one or more programs further including instructions for:

in response to detecting the first air gesture and in accordance with a determination that the first input does not correspond to selection of the first computer system and that the first input does not correspond to selection of the second computer system, performing a third operation corresponding to the first computer system.

35. The computer system of claim 17, the one or more programs further including instructions for:

after performing the first operation corresponding to the second computer system, detecting a second air gesture separate from the first air gesture, wherein the second air gesture is the same as the first air gesture; and in response to detecting the second air gesture, performing a fourth operation different from the first operation.

36. The computer system of claim 35, wherein the fourth operation corresponds to the second computer system.

37. The computer system of claim 35, wherein the fourth operation corresponds to the first computer system.

38. The computer system of claim 17, wherein:

the first computer system is in communication with a display component;

performing the first operation corresponding to the second computer system includes displaying, via the display component, a first user interface element; and performing the fourth operation includes displaying, via the display component, a second user interface element different from the first user interface element.

39. The computer system of claim 17, the one or more programs further including instructions for:

after performing the first operation corresponding to the second computer system, detecting, via the one or more input devices, a third air gesture separate from the first air gesture, wherein the third air gesture is the same as the first air gesture; and in response to detecting the third air gesture, performing the first operation corresponding to the second computer system.

40. The computer system of claim 17, the one or more programs further including instructions for:

after performing the first operation corresponding to the second computer system, detecting, via the one or more input devices, a fourth air gesture separate from the first air gesture, wherein the fourth air gesture is the same as the first air gesture; and in response to detecting the fourth air gesture:

in accordance with a determination that the fourth air gesture was detected within a threshold period of time, performing the first operation corresponding to the second computer system; and in accordance with a determination that the fourth air gesture was not performed within the threshold period of time, forgoing performing the first operation corresponding to the second computer system.

41. The computer system of claim 17, the one or more programs further including instructions for:

after detecting the first air gesture and after forgoing performing the first operation corresponding to the second computer system, detecting, via the one or more input devices, a fifth air gesture separate from the first air gesture, wherein the fifth air gesture is the same as the first air gesture; and in response to detecting the fifth air gesture, performing the first operation corresponding to the second computer system.

42. The computer system of claim 17, the one or more programs further including instructions for:

detecting, via the one or more input devices, a sixth air gesture different from the first air gesture; and in response to detecting the sixth air gesture:

in accordance with a determination that the sixth air gesture corresponds to an input of a first type, performing a fourth operation corresponding to the second computer system; and in accordance with a determination that the sixth air gesture corresponds to an input of a second type different from the first type, performing a fifth operation corresponding to the second computer system.

43. The computer system of claim 42, wherein the fourth operation is different from the fifth operation.

44. The computer system of claim 17, the one or more programs further including instructions for:

detecting, via the one or more input devices, a seventh air gesture separate from the first air gesture; and in response to detecting the seventh air gesture:

in accordance with a determination that the seventh air gesture corresponds to an input of a third type, performing a sixth operation corresponding to the first computer system; and in accordance with a determination that the seventh air gesture corresponds to an input of a fourth type different from the third type, performing a seventh operation corresponding to the first computer system.

45. The computer system of claim 44, wherein the input of the third type is specific to the first computer system such that an air gesture corresponding to the input of the third type always performs an operation corresponding to the first computer system.

* * * * *